United States Patent
Sato et al.

(10) Patent No.: US 7,020,808 B2
(45) Date of Patent: Mar. 28, 2006

(54) EVENT MEASURING APPARATUS AND METHOD, COMPUTER READABLE RECORD MEDIUM IN WHICH AN EVENT MEASURING PROGRAM IS STORED, AND COMPUTER SYSTEM

(75) Inventors: Mitsuru Sato, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 10/079,546

(22) Filed: Feb. 22, 2002

(65) Prior Publication Data

US 2002/0174389 A1   Nov. 21, 2002

(30) Foreign Application Priority Data

May 18, 2001 (JP) .............................. 2001-149166

(51) Int. Cl.
*G06F 11/00* (2006.01)
(52) U.S. Cl. .................... 714/47; 702/187; 714/704
(58) Field of Classification Search ................ 714/47, 714/704; 702/187
See application file for complete search history.

(56) References Cited

U.S. PATENT DOCUMENTS

| | | | | |
|---|---|---|---|---|
| 4,339,657 A | * | 7/1982 | Larson et al. ................ 714/704 |
| 4,845,615 A | * | 7/1989 | Blasciak ........................ 714/10 |
| 5,301,240 A | * | 4/1994 | Stockum et al. ............. 382/100 |
| 5,530,705 A | * | 6/1996 | Malone, Sr. .................. 714/704 |
| 5,606,563 A | * | 2/1997 | Dorbolo et al. .............. 714/704 |
| 5,796,939 A | | 8/1998 | Berc et al. .............. 395/184.01 |
| 6,263,458 B1 | * | 7/2001 | Miller et al. ................... 714/47 |
| 6,282,173 B1 | * | 8/2001 | Isonuma et al. ............. 370/242 |
| 6,577,961 B1 | * | 6/2003 | Holdsclaw et al. ........... 702/60 |
| 6,591,383 B1 | * | 7/2003 | Michel et al. ................ 714/704 |
| 6,694,288 B1 | * | 2/2004 | Smocha et al. .............. 702/186 |
| 6,721,909 B1 | * | 4/2004 | Butler .......................... 714/704 |
| 6,785,851 B1 | * | 8/2004 | Franck et al. .................. 714/47 |

FOREIGN PATENT DOCUMENTS

JP   HEI 10-260869   9/1998

* cited by examiner

*Primary Examiner*—Bryce Bonzo
(74) *Attorney, Agent, or Firm*—Staas & Halsey LLP

(57) ABSTRACT

An apparatus which can collect information for a long time or collect information on an entire memory space with a small hardware physical quantity while avoiding unnecessary overhead. The apparatus comprises a counting unit for counting the number of events having occurred in a processor or a computer system, a retaining unit for retaining a count value obtained by the counting unit, and a control unit for controlling writing of a count value into the retaining unit, wherein the control unit controls the writing so as to write a new count value obtained by the counting unit in said retaining unit while leaving a count value of a high degree of significance in the retaining unit. The apparatus is used to measure the number of events having occurred in the processor when the performance of the processor or the a computer system is measured or tuned.

22 Claims, 14 Drawing Sheets

EVENT MEASURING APPARATUS AND METHOD, COMPUTER READABLE RECORD MEDIUM IN WHICH AN EVENT MEASURING PROGRAM IS STORED, AND COMPUTER SYSTEM

BACKGROUND OF THE INVENTION

1) Field of the Invention

The present invention relates to a technique for measuring the number of events having occurred in a processor or a computer system, including various components such as a processor and a memory controller, in order to measure performance of the processor or the computer system, or tune the performance of the same.

2) Description of the Related Art

When the processing speed of a computer is increased, it is essential to grasp behavior of the computer at the time of program execution.

In order to examine in detail behavior of the computer, there is widely used a technique of measuring the number of various events having occurred inside the computer. For this purpose, an internal counter for measuring the performance is often equipped in the modern computer.

By using the counter for measuring the performance, it is possible to obtain the number of clocks for program execution, the number of accesses to the memory during execution of the program, and the like, for example. These kinds of behavior are all handled as "events", and the number of events having occurred is recorded in such a manner as to increment a counter (a count value) by one each time an event occurs. More concretely, when the number of execution clocks is measured in the former example, "elapse of one clock" is handled as one event, whereby an event occurs each time one clock elapses, and the counter is incremented by one each time an event occurs. Events are various, which cover all kinds of behavior necessary to measure the performance such as execution of a branch instruction, cache miss, memory read, memory write and the like, for example.

A recent computer system is often equipped with a counter in each part to be able to measure the performance. For example, Pentium Pro, which is a processor of Intel, is equipped with two counters for measuring the performance, and the processor can separately set (1) selection of events, (2) reading of a value, (3) setting of a value, (4) clearing of a value, (5) interruption at the time of overflow, and the like to each of the counters. Further, a similar counter is provided to the memory controller to be able to measure events in the vicinity of the memory bus.

With such a counter, it is possible not only to see a total value of the number of all events, but also to see fluctuation with time of the number of the events having occurred by sampling a measured value of the counter at each predetermined time. It is thereby possible to obtain various information about whether the number of events having occurred is stable or not, about a degree of fluctuation in the number of events having occurred, about whether the occurrence of events concentrates in processes in a specific time zone or not, and the like. It is further possible to use these kinds of information for not only merely measurement of the performance but also tuning of the system.

The above performance measuring counter can be used to not only measure a result of execution of a program but also optimize a dynamic program. Namely, there is applied a method in which the OS (Operating System) or the program refers a value of the counter during execution of the program so as to vary the operation of the program, thereby dynamically optimizing the program.

Considering here that memory accesses are dynamically optimized by an OS in a parallel computer of a distributed shared storage type as shown in, for example, FIG. 14. A parallel computer of a distributed shared storage type is configured by communicably connecting a plurality of nodes 100 with one another over an interconnection network 200. Each of the nodes 100 comprises a CPU (Central Processing Unit) 101, a memory 102, a memory controller 103 and a network interface 104.

The CPU 101 of each of the nodes 100 can freely access to not only the memory 102 in the node 100 to which the CPU 101 itself belongs but also a memory in another node 100. When seen from a certain CPU, there are a memory 102 to which the CPU can access at a high speed and a memory 102 that the CPU takes a longer time to access to it. Assuming here that the memory controller 103 in each of the nodes 100 functions as the above performance measuring counter (not shown) in the above parallel computer.

The OS assigns the memory 102 to a program when the program issues a memory request. When assigning the memory 102, the OS cannot know how the memory 102 is used. For this, the OS cannot determine whether the memory 102 belonging to a node 100 of the same CPU 101 or the memory 102 belonging to another node 100 should be assigned. It is generally desirable to assign the memory 102 in the same node 100, but it is not in some cases.

The two performance measuring counters 1 and 2 count the following events, respectively:

Counter 1: incrementing the count value by one when the CPU 101 in the same node 100 accesses;

Counter 2: incrementing the count value by one when the CPU 101 in another node 100 accesses.

A program is executed in this state, and a value of the counter is checked at each predetermined time. When the count value of the counter 1 is close to zero, and the count value of the counter 2 is sufficiently large, it is known that the CPU 101 requiring the memory 102 belongs to another node 100. In such case, the OS changes the assignment of the memory 102, and moves data to close to the CPU 101 that actually requires the memory 102. When seen from the CPU 101, most of the data required by the CPU 101 is on the memory 102 to which the CPU 101 can access at a high speed, so that the speed of execution of the program is increased.

In a computer such as Origin 2000 of SGI (Sillicon Graphics Inc.), a counter for totaling memory accesses is equipped beside the memory for this purpose. This counter is provided for each page to measure the number of accesses for each page by referring to it at each predetermined time from the OS.

In the above known measuring method, a quantity of count values obtained by the counter becomes enormous when the sampling is performed for a long time or when the number of events having occurred in each memory block is measured over the entire memory space. For this, the known measuring method can be adapted to a large-sized computer allowing a sufficient cost, but cannot be adapted to a small-sized computer requiring a reduction in cost as much as possible, which needs to shift a small number of counters to collect data.

Considering the above Origin 2000 of SGI, for example. Origin 2000 has a reference counter for 64 nodes per page. Assuming that a page size is 4 KB, and one retaining area (this area being sometimes referred as a counter) for count values obtained by the counter is 32 bits, the counter requires a memory size of one-one hundred twenty eighth of the entire memory. This cannot be accommodated inside the LSI, thus has to be realized as an external memory. Securing an area for the counter as this causes not only an increase in physical quantity of hardware, but also a problem that the design of the hardware becomes complex. Particularly, this method cannot be accomplished in a relatively small-sized computer in which the cost is given importance.

In the case of measurement using a counter of a small capacity, such a method is heretofore employed that, when count values that are an object of measurement exceed the capacity of the counter, the count values are temporarily written onto the memory from the retaining area, or a count value obtained by the counter is overwritten in order in the retaining area.

In the former method, overhead to write count values onto the memory is present, and a control using software or complex hardware is necessary. In the performance measurement, it is desirable to avoid unnecessary overhead in order to decrease measurement errors as much as possible. The former method has a disadvantage in this point.

In the latter method, count values are simply overwritten in order, so that only a count value measured at a time very close to when the counter is observed is left in the counter (retaining area). For this, information by which determination can be made on the whole performance (a significant count value necessary to determine the performance) cannot be obtained.

Japanese Laid-Open Publication No. 10-260869 discloses a method for efficiently managing a performance counter which samples performance of a processor using a hash table. However, this method cannot decrease a physical quantity of the counter although management of the performance counter becomes efficient, but requires hardware necessary for the management, which cannot be applied to a relatively small-sized computer in which the cost is given importance.

SUMMARY OF THE INVENTION

In the light of the above problems, an object of the present invention is to be able to collect information for a long time or collect information on the entire memory space while avoiding unnecessary overhead, and with a small hardware physical quantity, and to certainly measure or tune the performance of a relatively small-sized processor.

The present invention therefore provides an event measuring apparatus comprising a counting unit for counting the number of events having occurred in a processor or a computer system including various components such as a processor and a memory controller, a retaining unit for retaining a count value obtained by the counting unit, and a control unit for controlling writing of the count value into the retaining unit, the control unit controlling the writing so as to write a new count value obtained by the counting unit into the retaining unit while leaving a count value of a high degree of significance in the retaining unit.

The counting unit may count the number of the events having occurred within a period of predetermined time at each of the predetermined time, and the control unit may write a count value obtained by the counting unit as the new count value along with a measuring time of the count value into the retaining unit at each of the predetermined time. At this time, the degree of significance is the count value.

Alternatively, the counting unit may count the number of each kind of events by updating a count value in the retaining unit, and when the counting unit starts to count the number of events of a new kind not retained in the retaining unit, the control unit may secure a retaining area to retain therein a count value of the events of a new kind on the retaining unit, and write the count value of the events of a new kind having occurred as the new count value into the retaining area. At this time, the degree of significance is an updating time of the count value by the counting unit.

The event measuring apparatus may further comprise an error measuring unit for measuring a total value of count values, discarded by overwriting the new count values thereon in the retaining unit, as an error and retain the same.

The present invention further provides an event measuring method comprising the steps of a counting step of counting the number of events having occurred in a processor or a computer system, and a writing step of writing a new count value into a retaining unit while leaving a count value of a high degree of significance in the retaining unit when the new count value is obtained at the counting step.

The present invention still further provides a record medium recording thereon an event measuring program which makes a computer function as the counting unit, and the control unit.

The present invention still further provides a computer system comprising a processor for performing information processing, the counting unit, the retaining unit, and the control unit.

The present invention provides a technique which can handle a lot of count values with a small hardware physical quantity, that is, a memory capacity in a degree that it can be contained in LSI, for example.

When the performance of a processor or a computer system is measured or tuned, not all count values become necessary, but only a time at which a count value per unit time peaks and the peak value suffice, in many cases.

When information on a block (a page or the like) frequently accessed is collected in, for example, a memory system, a block frequently accessed is very small when compared with the entire memory space, in general. For this, even if count value retaining areas for all the blocks in the memory space are prepared, most of the areas become wasteful, which leads to inefficiency.

For this, an element of "degree of significance" is given to each count value, and only count values of high degrees of significance are left in the system (the retaining unit). It is thereby possible to collect only values highly necessary, and information for a long time or information on the entire memory space while avoiding unnecessary overhead and with a small hardware physical quantity (a small memory capacity).

The event measuring apparatus and method, the computer readable record medium recording an event measuring program thereon and the computer system of this invention can provide the following effects and advantages:

(1) When count values that are an object of measurement exceeds a capacity of the retaining unit, a new count value is overwritten in the retaining unit while leaving a count value of a high degree of significance is left in the retaining unit, whereby count values highly necessary can be collected even if the capacity of the retaining unit is small. Namely, even when the number of events having occurred is measured for a long time or in a wide range, only data necessary to obtain statistical information is left in the retaining unit, and data useful to finally determine the overall performance of the processor or the computer system can be obtained. Accordingly, it is possible to collect information for a long time, or collect information on the entire memory space, which allows certain performance measurement or performance tuning even in a relatively small-sized processor.

(2) The number of events having occurred within a period of a predetermined time is counted at each of the predetermined time. When there is no vacant area into which the count value is to be written in the retaining unit, a count value of the lowest degree of significance is expelled from the retaining unit, and the new count value is written therein along with its measuring time. As this, only significant information is retained in the retaining unit, whereas information of a low degree of significance is expelled. It is therefore possible to efficiently collect data for a long time using the retaining unit of a small capacity without saving count values onto the memory or starting special software.

(3) At this time, the count value itself is assigned as a degree of significance, so that the smallest count value is discarded from the retaining unit in order, a larger count value is handles as a value of a higher degree of significance, thus a larger count value is preferentially left in the retaining unit. Accordingly, it is possible to collect a time at which events have frequently occurred and the number of the events for a long time by measuring the number of events having occurred at each predetermined time and retaining the number of events along with the measuring time in the retaining unit. Whereby, it is possible to collect a peak value of occurrence of events and a time at which the peak of occurrence of events, whereby a part of the data structure in which cache miss frequently occurs can be corrected, and data useful to improve the performance of the processor can be obtained, for example.

(4) A value obtained by substituting a count value for a predetermined function is used as a degree of significance, whereby plural kinds of count values measured on different bases can be compared on a common basis. Even if plural kinds of count values measured on different bases mix in the retaining unit, it is possible to leave count values of high degrees of significant irrespective of their kinds.

(5) When measurement of the number of a new kind of events is started, a count value of the lowest degree of significance is expelled from the retaining unit and a new count value is written therein if there is no vacant area into which the new count value is to be written. Accordingly, only information of necessary kinds is retained in the retaining unit, whereas information of kinds of low degrees of significance is expelled therefrom. It is thus possible to efficiently collect data in a wide range or data of many kinds using the retaining unit of a small capacity without saving count values onto the memory or starting special software.

(6) At this time, an updating time of the count value obtained by the counting unit is considered to be "a degree of significance." Whereby, a count value having the oldest updating time is discarded from the retaining unit in order, the highest degree of significance is given to a count value updated latest, thus a count value having the latest updating time is preferentially left in the retaining unit. When an updating time is used as a degree of significance as this, it is possible to more reduce overhead when compared with a case where count values are sorted, with the count values themselves being considered as degrees of significance, for example.

(7) In the retaining unit, the entire area holding count values is divided into a plurality of set using a hash table, and a set associative system of overwriting a new count value on the basis of an updating time of a count value in each set is employed. It is thereby possible to readily and certainly manage plural kinds of count values according to their updating times.

(8) The entire memory space in the processor or the computer system is divided into a plurality of blocks, and the number of accesses to each block is counted as the number of events having occurred while an address of each block is recognized as a kind of events. It is thereby possible to efficiently collect information on a block in which the events have frequently occurred in the entire vast memory space and the number of events using the retaining unit of a small capacity without saving count values onto the memory or starting special software.

(9) The number of events having occurred is counted while an address of an instruction that is a factor causing occurrence of an event is recognized as a kind of events. It is thereby possible to efficiently collect information on instructions having caused frequent occurrence of events among all execution instructions, and the number of events using the retaining unit of a small capacity without saving count values onto the memory or starting special software.

(10) A total value of discarded count values is measured as an error and held when count values of low degrees of significance are discarded, it is thereby possible to compare the magnitude (a total value) of all count values discarded by overwriting from the retaining unit with count values finally left in the retaining unit. This allows the user to recognize what rate to the whole count values count values have been discarded is. Namely, the user can recognize how much values finally left in the retaining unit reflect the whole count values to determining certainty of the count values left in the retaining unit.

DESCRIPTION OF THE PREFERRED EMBODIMENTS

Hereinafter, description will be made of embodiments of this invention with reference to the drawings.

[1] Description of First Embodiment

Figure 1:
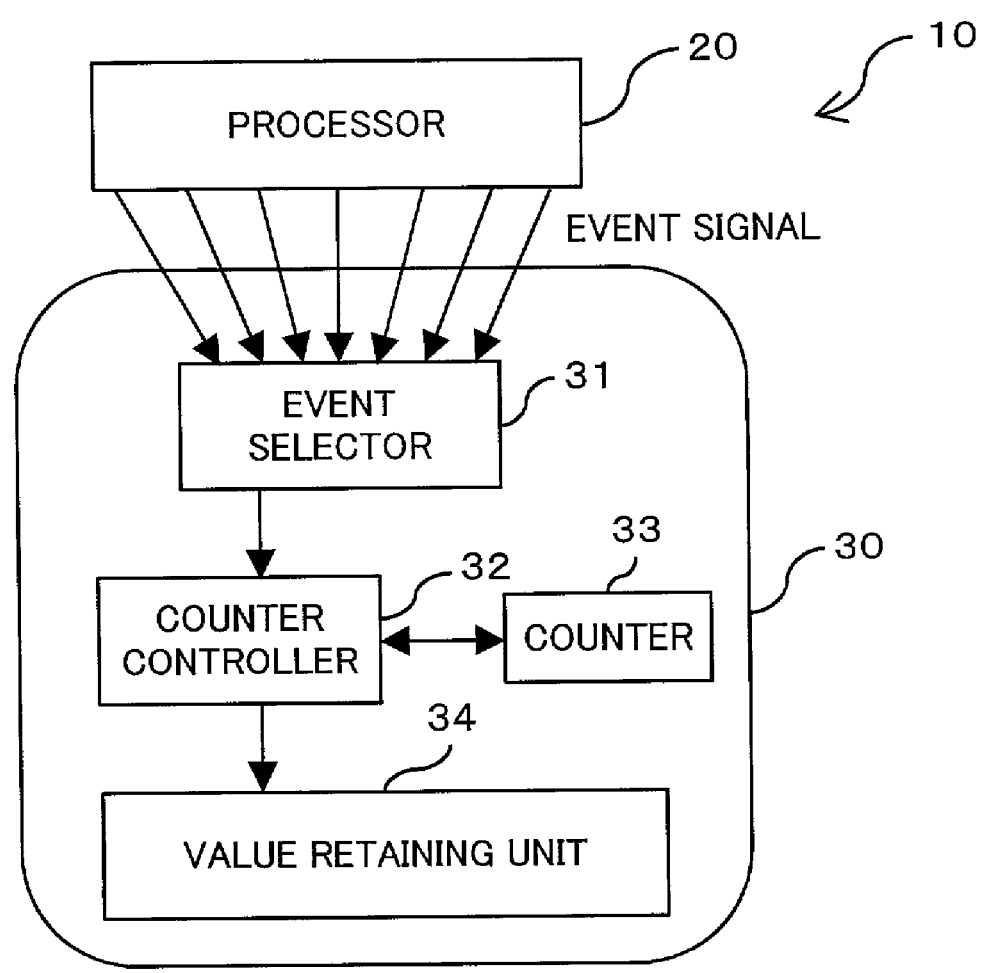
FIG. 1 is a block diagram showing structures of an event measuring apparatus (a performance measuring counter) and a computer system according to a first embodiment of this invention.

FIG. 1 is a block diagram showing structures of an event measuring apparatus (a performance measuring counter) and a computer system according to a first embodiment of this invention.

As shown in FIG. 1, the computer system 10 according to the first embodiment comprises a processor 20, a performance measuring counter 30 and various components (not shown) such as other processors and memory controllers.

The processor 20 performs information processing, which is an object of performance measurement (an object of measurement of the number events having occurred).

The performance measuring counter (the event measuring apparatus) 30 is integrated in the computer system 10 to measure the number of events having occurred, which are objects of measurement, in the processor 20 (or the computer system 10). The performance measuring counter 30 comprises an event selector 31, a counter controller 32, a counter 33 and a value retaining unit 34. The performance measuring counter 30 according to the first embodiment measures and collects the number (the number of times of occurrence) of events having occurred within a period of predetermined time at each of the predetermined time. Hereinafter, the above predetermined time will be sometimes referred as a sampling time or a sampling cycle.

The event selector 31 receives an event signal from each part of the processor 20 to function as follows: Each event signal is sent from the processor 20 to the event selector 31 whenever a specific event (for example, elapse of one clock, occurrence of memory read, execution of a jump instruction, or the like) occurs. Event conditions are set to the event selector 31 from the outside. Various event conditions can be set, as occurrence of an event A, simultaneous occurrence of events A and B, etc. When the event condition is satisfied, the event selector 31 sends a signal to the counter controller 32 to instruct the counter controller 32 to increment the count value of the counter 33 by one.

The counter controller 32 controls the value of the counter 33, besides functioning as a control unit to control writing of the count value into the value retaining unit 34. When writing a count value obtained in each sampling cycle into the value retaining unit 34, the counter controller 32 performs such a write control as to leave a count value of a higher degree of significance in the value retaining unit 34, as will be described later. The counter controller 32 increments the count value of the counter 33 by one when receiving a signal from the event selector 31.

The counter controller 32 is provided with a timer (not shown) for measuring the above predetermined time. The above predetermined time can be arbitrarily designated from the outside. The number of events that have occurred within a designated predetermined time is counted using the timer. When the designated predetermined time has elapsed, the counter controller 32 sends a value of the counter 33 to the value retaining unit 34, and clears the value of the counter 33. The counter controller 32 then clears the timer, and again starts to measure the predetermined time by the timer.

Incidentally, the counter controller 32 can arbitrarily clear a count value of the counter 33 to zero, or set an arbitrary value to the same according to an instruction from the outside. The counter controller 32 also has a function of generating interruption to the processor 20 according to a count value of the counter 33 (for example, when the count value of the counter overflows, etc.).

The event selector 31, the counter controller 32 and the counter 33 together fulfil a function as a counting unit for counting the number of events having occurred in the processor 20.

Figure 2:
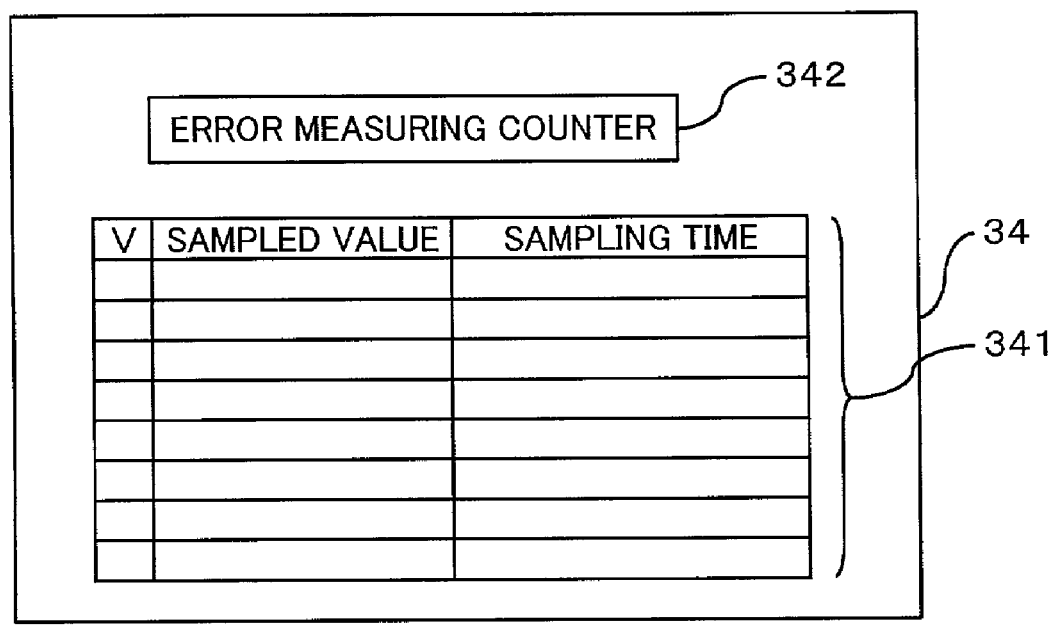
FIG. 2 is a diagram showing a structure of a value retaining unit according to the first embodiment.

The value retaining unit (a retaining unit) 34 retains a count value (a count value obtained in each sampling cycle) obtained using a function of the above counting unit, which comprises a count value retaining area 341 and an error measuring counter 342, as shown in FIG. 2.

The count value retaining area (a retaining area) 341 has a predetermined number of records each of which can hold a count value (hereinafter, occasionally referred as a sampled value) obtained in each sampling cycle. Each record holds a sampling time and a sampled value, together with a valid/invalid bit (mentioned as V in the drawing) representing whether the record is valid or invalid. "1" is set to the valid/invalid bit V when the record is valid. On the other hand, "0" is set when the record is invalid. According to this embodiment, a count value (a sampled value) itself is handled as a degree of significance of the count value. For this, the count value retaining area 341 includes no region for retaining a degree of significance.

The error measuring counter (an error measuring unit) 342 records a total value of values having overflowed from the count value retaining area 341. Namely, the error measuring counter 342 measures a total value of count values discarded by overwriting new count values thereon in the count value retaining area 341 in the value retaining unit 34, as an error, and retains it.

When receiving a value (a sampled value) of the counter 33 from the counter controller 32, the above value retaining unit 34 retains the value in units of record along with the present time (a sampling time). Upon retaining as above, the sampled values are sorted in the descending order. When the count value retaining area 341 is full, that is, when the valid/invalid bits V of all the records are "valid", a new sampled value is compared with the smallest one among sampled values already retained in the count value retaining area 341. When the new sampled value is larger, the retained smallest sampled value is discarded, and the new sampled value is overwritten thereon along with its sampling time, and retained. After that, all of the sampled values are sorted in the descending order. The discarded sampled value is sent to the error measuring counter 342, and added to the present count value of the counter 342.

The above event selector 31 and counter controller 32 (the counting unit and the control unit) are realized by exclusive software (an event measuring program). The event measuring program is provided in a form that the event measuring program is recorded on a computer readable record medium such as a flexible disk, a CD-ROM or the like. According to the first embodiment, the event measuring program is beforehand stored in a ROM (Read Only Memory; not shown) or the like configuring the performance measuring counter 30 or the like, and a CPU (not shown) configuring the performance measuring counter 30 reads the event measuring program and executes it, thereby realizing functions of the above event selector 31 and counter controller 32. The counter 33 and the value retaining unit 34 are realized by a RAM (Random Access Memory; not shown) or the like configuring the performance measuring counter 30. Incidentally, the event measuring program may be recorded on a storage apparatus (a record medium) such as a magnetic disk, an optical disk, an magnet-optical disk or the like, and provided to the computer from the storage apparatus over a communication path.

Figure 3:
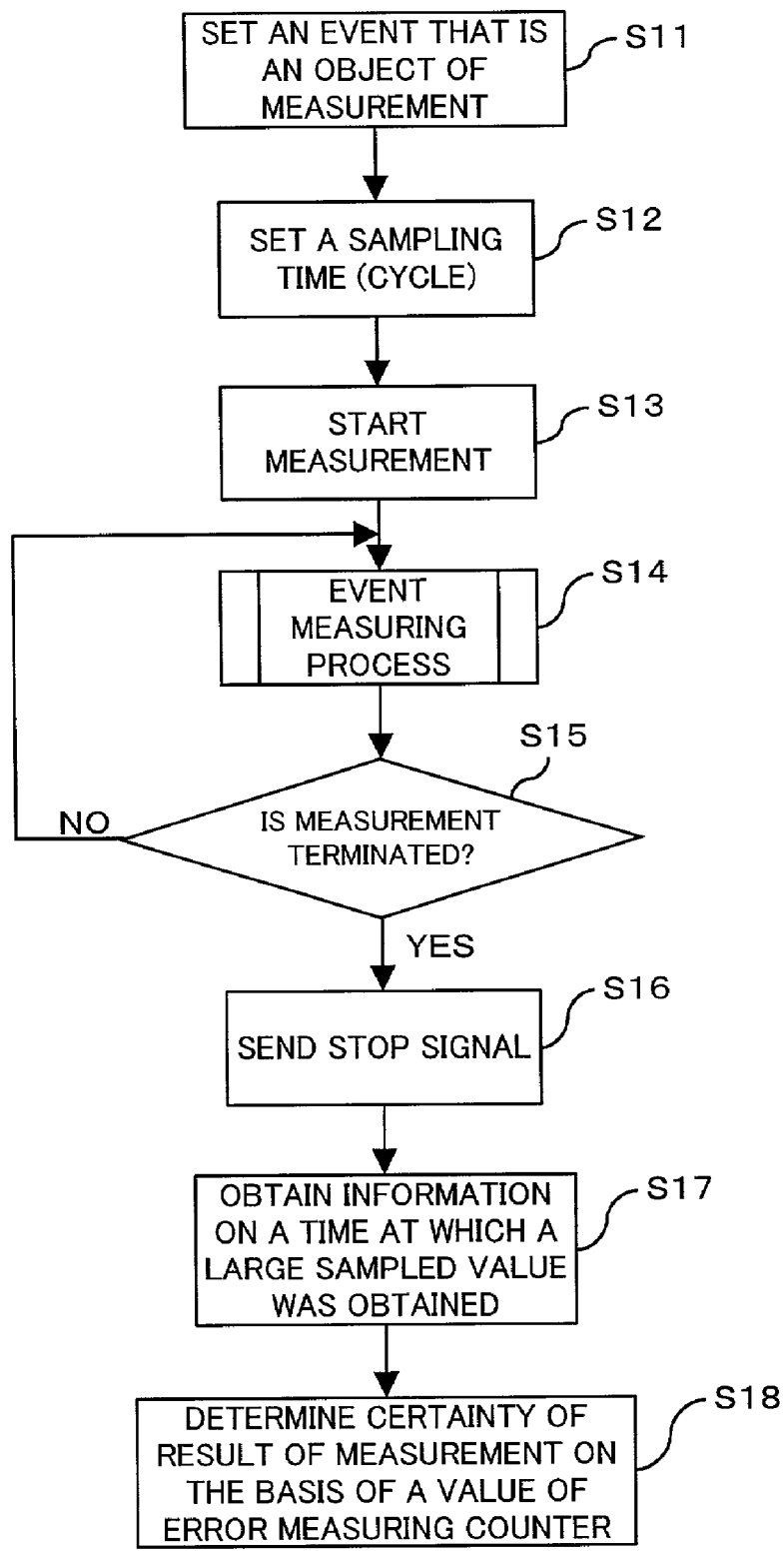
FIG. 3 is a flowchart for illustrating a procedure of collecting information on performance of the processor (or the computer system) according to the first embodiment.
Figure 4:
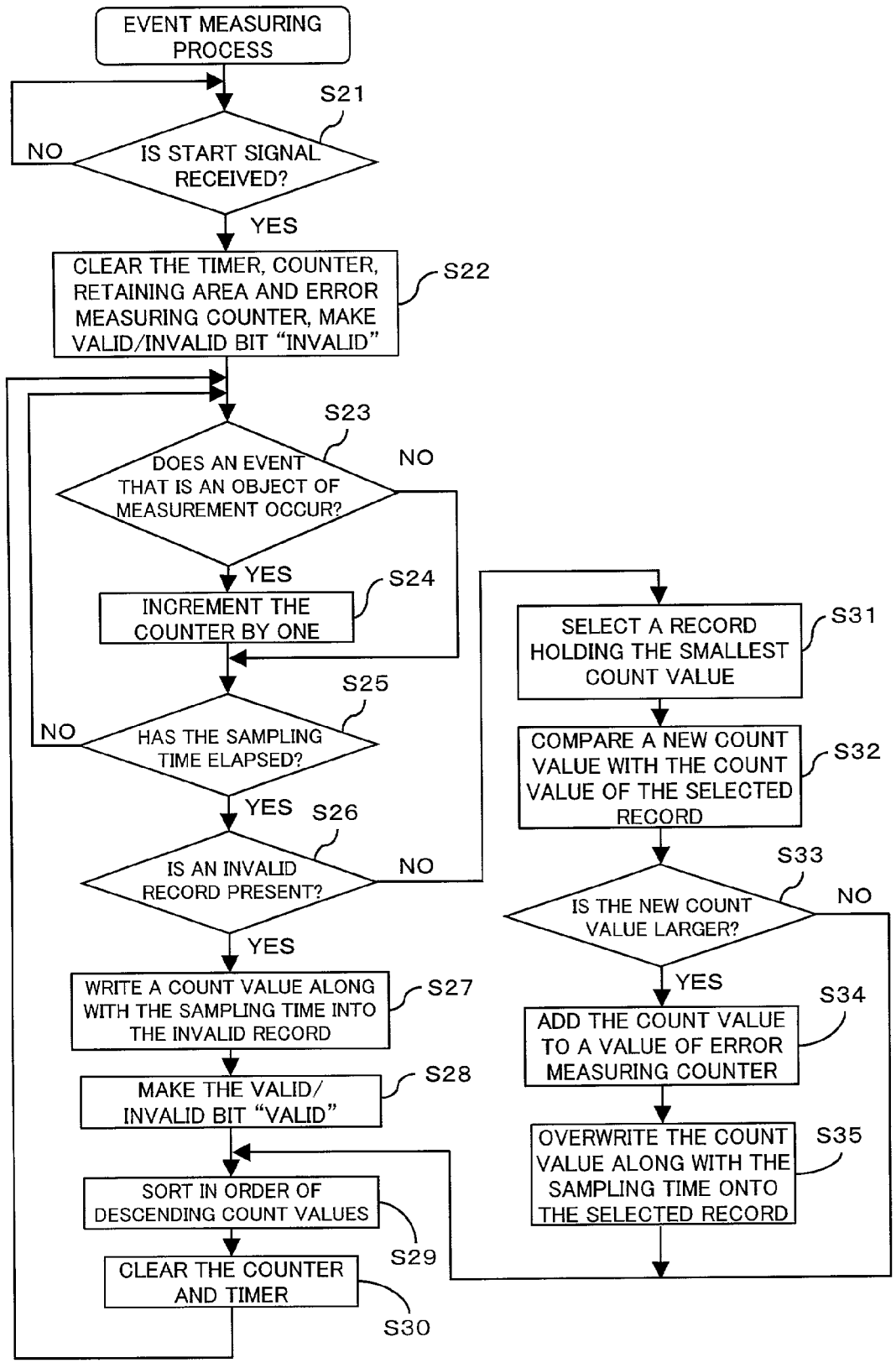
FIG. 4 is a flowchart for illustrating a procedure of measuring events according to the first embodiment.

Next, an operation of the performance measuring counter 30 in the above structure according to the first embodiment will be described with reference to FIGS. 3 and 4.

First, a procedure of collecting information on the performance of the processor 20 according to the first embodiment will be described with reference to a flowchart (steps S11 to S18) shown in FIG. 3. The user selects a kind of events (for example, the number of times of cache miss or the like) that the user desires to collect, sets it as an event that is an object of measurement in the event selector 31 (step S11). The user also selects a sampling time (a sampling cycle; one second, for example), and sets it as the above predetermined time in the counter controller 32 (step S12).

After that, the user sends a start signal to the performance measuring counter 30 (the event selector 31 and the counter controller 32) to start event measurement (step S13). Whereby, an event measuring process to be described later with reference to FIG. 4 is executed (step S14). When the event measuring process is terminated (YES route at step S15), the user sends a stop signal to the performance measuring counter 30 to terminate the measuring operation by the performance measuring counter 30 (step S16).

The user takes out collected data from the value retaining unit 34 to obtain information on a time at which a large sampled value was obtained and a sampled value at that time (step S17). The user compares a total value of the sampled values retained in the value retaining unit 34 with a value of the error measuring counter 342 to recognize what rate to the whole sampled values discarded sampled values is, and judges certainty of finally obtained sampled values (values left in the value retaining unit 34) (step S18).

Next, a procedure of measuring events (the event measuring process at step S14 in FIG. 3) according to the first embodiment will be described with reference to a flowchart (steps S21 to S35) shown in FIG. 4.

When the performance measuring counter 30 receives a start signal (YES route at step S21), the counter controller 32 clears its timer to "0", sets "0" to all values of the counter 33, the count value retaining area 341 and the error measuring counter 342, as well, and sets "invalid" to the valid/invalid bit V in each of the records in the count value retaining area 341 (step S22).

With the received start signal, the event selector 31 is brought into a state that the event selector 31 can output a signal for incrementing the counter 33 one by one to the counter controller 32. When an event satisfying the predetermine condition (an event that is an object of measurement) occurs (YES route at step S23), the event selector 31 output an increment signal to the counter controller 32 to increment the count value of the counter 33 by one (step S24). Incidentally, when receiving a stop signal at step S16 in FIG. 3, the event selector 31 stops to output the increment signal.

The counter controller 32 measures the predetermined sampling time by the timer irrespective of presence/absence of occurrence of the event, determines at all times whether the sampling time has elapsed or not (from step S24 to step S25, or from NO route at step S23 to step S25), and repetitively executes the process at steps S23 to S25 until the sampling time has elapsed.

When the sampling time has elapsed (YES route at step S25), the counter controller 32 determines whether a vacant record (that is, an invalid record a valid/invalid bit V of which is in an invalid state) is present in the count value retaining area 341 (step S26).

When an invalid record is present (YES route at step S26), a count value (a sampled value) of the counter 33 at that time and its sampling time are written in the invalid record (step S27), and the valid/invalid bit V in that invalid record is changed from the invalid state to the valid state (step S28). After that, the records are sorted in order of descending sampled values (step S29), "0" is set to the counter 33 and the timer (step S30), and the procedure returns to step S23.

When all the records in the count value retaining area 341 are in the valid state, thus no invalid record is present (NO route at step S26), a record having the smallest sampled value (a record at the bottom) is selected among all the records in the count value retaining area 341 (step S31), and a count value sampled this time (a new count value) is compared with the sampled value of the record selected at step S31 (hereinafter referred as a selected record) (step S32).

When the comparison results in that the new count value is larger (YES route at step S33), the sampled value in the selected record is added to a value of the error measuring counter 342 (step S34), and the new count value and the sampling time are overwritten in the selected record (step S35).

After such the retaining process, or when the sampled value in the selected record is not less than the new count value at step S31 (NO route at step S33), the records are sorted in order of descending sampled values (step S29), "0" is again set to the counter 33 and the timer (step S30), then the procedure returns to step S23.

According to this embodiment, a counting step of counting the number of events having occurred in each sampling cycle in the processor 20 (or the computer system 10) is realized at the above steps S23 to S25. A writing step of writing a new sampled value obtained at the above counting step into the count value retaining area 341 while leaving a sampled value of a high degree of significance in the count value retaining area 341 is realized at the above steps S26 to S35.

According to the first embodiment of this invention, an attribute of "significance" (a count value itself in this embodiment) is given to each count value stored in the count value retaining area 341 in the value retaining unit 34, whereby a new count value is overwritten in a record of a low degree of significance when a count value to be written occurs in excess of a capacity of the count value retaining area 341 in the value retaining unit 34. A count value (a sampled value) in relation with a value of a high degree of significance is always left in the value retaining unit 34.

Here, consideration is made on practical events to be recorded by the performance measuring counter 30 according to the first embodiment of this invention. When information on a wide region that is an object of measurement is efficiently collected, there are two cases where the region is wide with respect to time, and where the region is wide with respect to space. When the region to be measured is wide with respect to time, a count value is sampled in each predetermined time, and continuously recorded. If this is tried to be realized with the count value retaining area 341 having a limited size, data will soon overflow, thus all data will not be able to be recorded.

The performance measuring counter 30 according to the first embodiment complies with such situation, by having the count value retaining area 341 of a small capacity, retaining a sampled value and its sampling time in each record, and using the sampled value itself as a degree of significance. When a newly sampled count value is added, a count value is expelled from a record of the lowest degree of significance when there is no vacant record, and the new count value is recorded therein.

Even if the capacity of the value retaining unit 34 is small, it is possible to certainly and efficiently obtain count values highly required. Even when sampled values are obtained at predetermined cycles for a long period, only data necessary to obtain statistical information is left in the value retaining unit 34, and data useful to determine the whole performance of the processor 20 (or the computer system 10) can be obtained finally.

It is therefore possible to collect information for a long time with a small hardware physical quantity (for example, a memory capacity in a degree that can be held in an LSI) while avoiding unnecessary overhead, thus performance measurement or performance tuning can be done even in a relatively small-sized processor. In other words, since only important information is retained in the value retaining unit 34 and information of a low degree of significance is expelled, it is possible to efficiently collect data for a long time using a small-capacity retaining unit without saving sampled values onto the memory or starting special software.

The first candidate for a reference to judge a degree of significance is a sampled value itself, as described in the first embodiment. Namely, a large sampled value is significant, but a small sampled value is less significant. The small sampled value is overwritten by a new sampled value, whereas the large sampled value is preferentially left in the value retaining unit 34.

Accordingly, times at which a number of events occurred and the number of the events can be collected for a long time. Whereby, a peak value of occurrence of events and a time at which the peak occurred can be collected. This allows to find a page in which the cache miss has frequently occurred, correct a data structure in that part, and obtain data useful to improve the performance of the program.

If a sampled value of a low degree of significance is discarded, it becomes impossible to determine how much the sampled value overwritten and deleted is significant. For example, when significance of all sampled values are in the same degree, sampled values left in the count value retaining area 341 are values that happen to be left, thus being not always values more significant than the discarded sampled values.

For this, when sampled values of lower degrees of significance are discarded, the error measuring counter 342 measures and retains a total value of the sampled values as an error, and an amount (a total value) of all sampled values discarded by overwriting from the value retaining unit 34 is compared with sampled values finally left in the value retaining unit 34 (the count value retaining area 341), according to the first embodiment.

It is thus possible to recognize what rate to all the sampled values have been discarded although each of the discarded sampled values is unknown. Namely, it is possible to recognize how much values finally left in the value retaining unit 34 reflect all the sampled values, thereby determining certainty of the sampled values left in the value retaining unit 34.

In the first embodiment, it is meaningless to use, as do in a second embodiment, an access time (an updating time) as a degree of significance instead of a sampled value. A reason of this is that a sampled value in the first embodiment may not be updated to a new count value although it may be discarded by overwriting after written in a record in the count value retaining area 341, which prevents the count value retaining area 341 from being merely a ring buffer.

[2] Description of Second Embodiment

Figure 5:
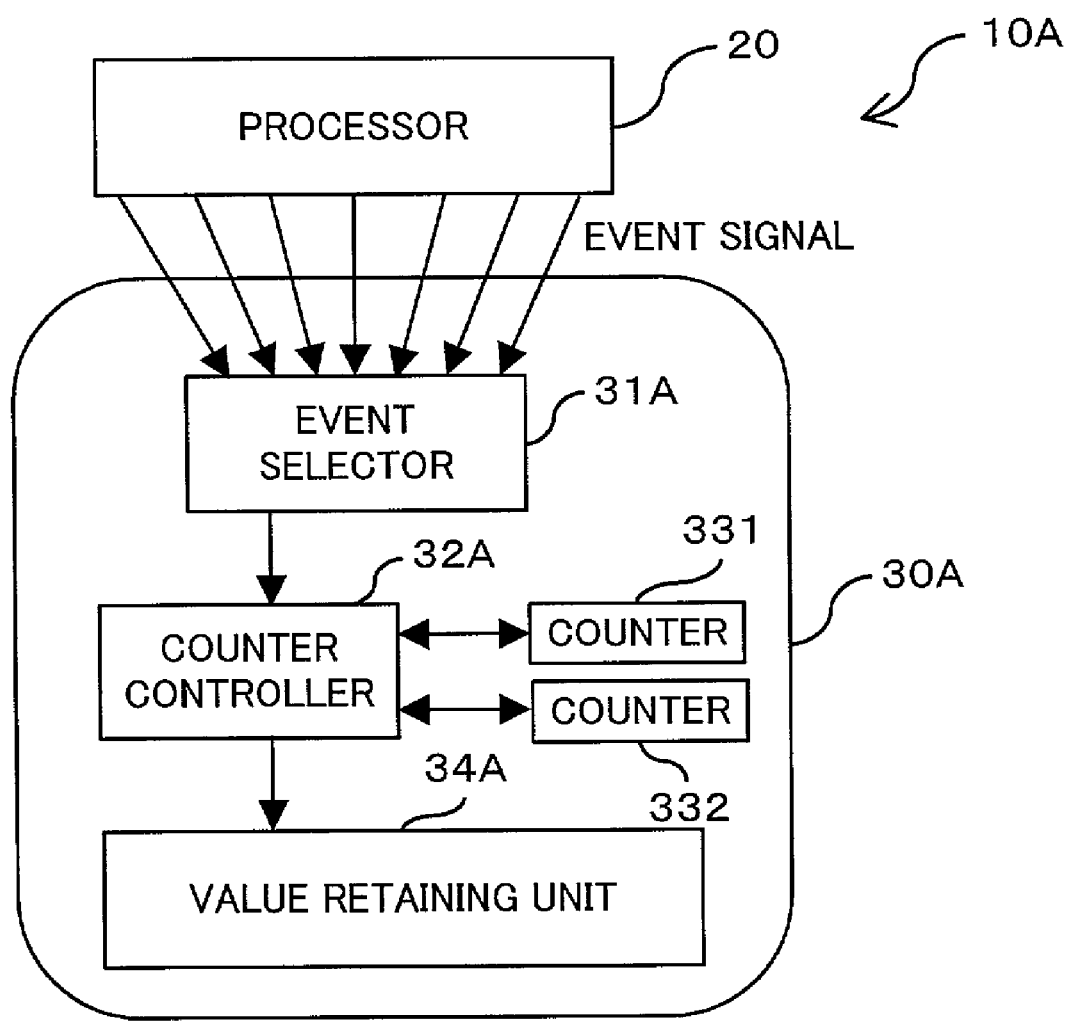
FIG. 5 is a block diagram showing a structure of an event measuring apparatus (a performance measuring counter) and a computer system according to a second embodiment of this invention.
Figure 6:
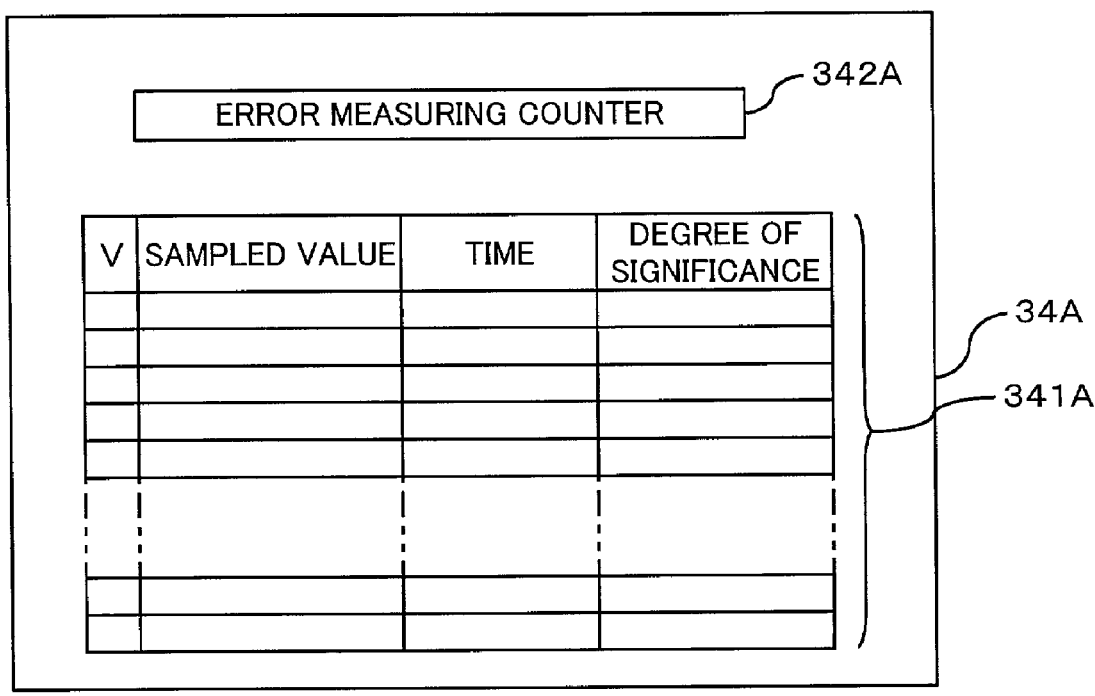
FIG. 6 is a diagram showing a structure of a value retaining unit according to the second embodiment.

FIG. 5 is a block diagram showing a structure of an event measuring apparatus (a performance measuring counter) and a computer system according to the second embodiment of this invention. FIG. 6 is a diagram showing a structure of a value retaining unit according to the second embodiment.

As shown in FIG. 5, a computer system 10A according to the second embodiment comprises a processor 20, a performance measuring counter 30A and various components (not shown), similarly to the first embodiment shown in FIG. 1.

The performance measuring counter (the event measuring apparatus) 30A according to the second embodiment is integrated in the computer system 10A to measure the number of events having occurred, which are an object of measurement, in the processor 20 (or the computer system 10A). The performance measuring counter 30A comprises an event selector 31A, a counter controller 32A, counters 331 and 332, and a value retaining unit 34A.

Like the performance measuring counter 30 shown in FIG. 1, the performance measuring counter 30A counts and collects the number of events having occurred within a period of predetermined time at each of the predetermined time. Although the performance measuring counter 30 has one counter 33, the performance measuring counter 30A according to the second embodiment has two counters 331 and 332 to measure the number of two kinds of events having occurred.

The performance measuring counter 30 according to the first embodiment uses a sampled value (a count value) as a degree of significance, whereas the performance measuring counter 30A according to the second embodiment uses a value calculated by substituting a count value (a sampled value) for a predetermined function as a degree of significance, as will be described later.

The event selector 31A is similar to the above-mentioned event selector 31. According to the second embodiment, two kinds of event conditions are set to the event selector 31. When detecting occurrence of an event satisfying either one of the two kinds of event conditions, the event selector 31A sends a signal to the counter controller 32A, whereby the counter controller 32A increments a count value of a corresponding counter 331 or 332 by one.

The counter controller 32A is similar to the above-mentioned counter controller 32. According to the second embodiment, the counter controller 32A fulfils a function as a control unit to control values of the two counters 331 and 332, and to control writing of a count value into the value retaining unit 34A. When writing a count value obtained in each sampling cycle into the value retaining unit 34A, the counter controller 32A performs a write control such that a count value of a high degree of significance is left in the value retaining unit 34A. When receiving a signal from the event selector 31A, the counter controller 32A increments a count value of a counter 331 or 332 corresponding to a kind of the event by one.

The counter controller 32A has a timer (not shown) similar to that described above. When detecting by the timer that a predetermined time has elapsed, the counter controller 32A sends count values of the counters 331 and 332 to the value retaining unit 34A, clears the values of the counters 331 and 332, and clears the timer.

The counter controller 32A has a function of substituting count values obtained by the counters 331 and 332 for respective predetermined functions to calculate degrees of significance corresponding to the respective count values. Two kinds of count values measured on different bases can be compared on a common basis. For example, one of the count values is used as a degree of significance, similarly to the first embodiment, whereas a product of the other count value and a constant is used as a degree of significance.

The value retaining unit (a retaining unit) 34A is similar to the above-mentioned value retaining unit 34. As shown in FIG. 6, the value retaining unit 34A comprises a count value retaining area 341A and an error measuring counter 342A.

According to the second embodiment, the count value retaining area (a retaining area) 341A has a predetermined number of records being able to hold two kinds of sampled values obtained by the above two counters 331 and 332. Each of the records includes an area holding a sampling time and a sampled value, a valid/invalid bit V, and an area holding a degree of significance calculated as above. Each of the records may include an area holding identification information for identifying a kind of events.

Like the error measuring counter 342 mentioned above, the error measuring counter (an error measuring unit) 342A measures a total value of count values discarded by overwriting new count values thereon in the count value retaining area 341A of the value retaining unit 34A, as an error, and holds it. According to the second embodiment, the error measuring counter 342A also holds a total value of degrees of significance given to the discarded count values. These total values may be calculated and held irrespective of a kind of events, or may be calculated and held for each event.

As in the first embodiment, a function as a counting unit for counting the number of events having occurred in the processor 20 (or the computer system) is realized by the above event selector 31A, counter controller 32A and counter 33A.

As in the first embodiment, the event selector 31A and the counter controller 32A (the counting unit and the control unit) described above are realized by exclusive software (an event measuring program).

Figure 7:
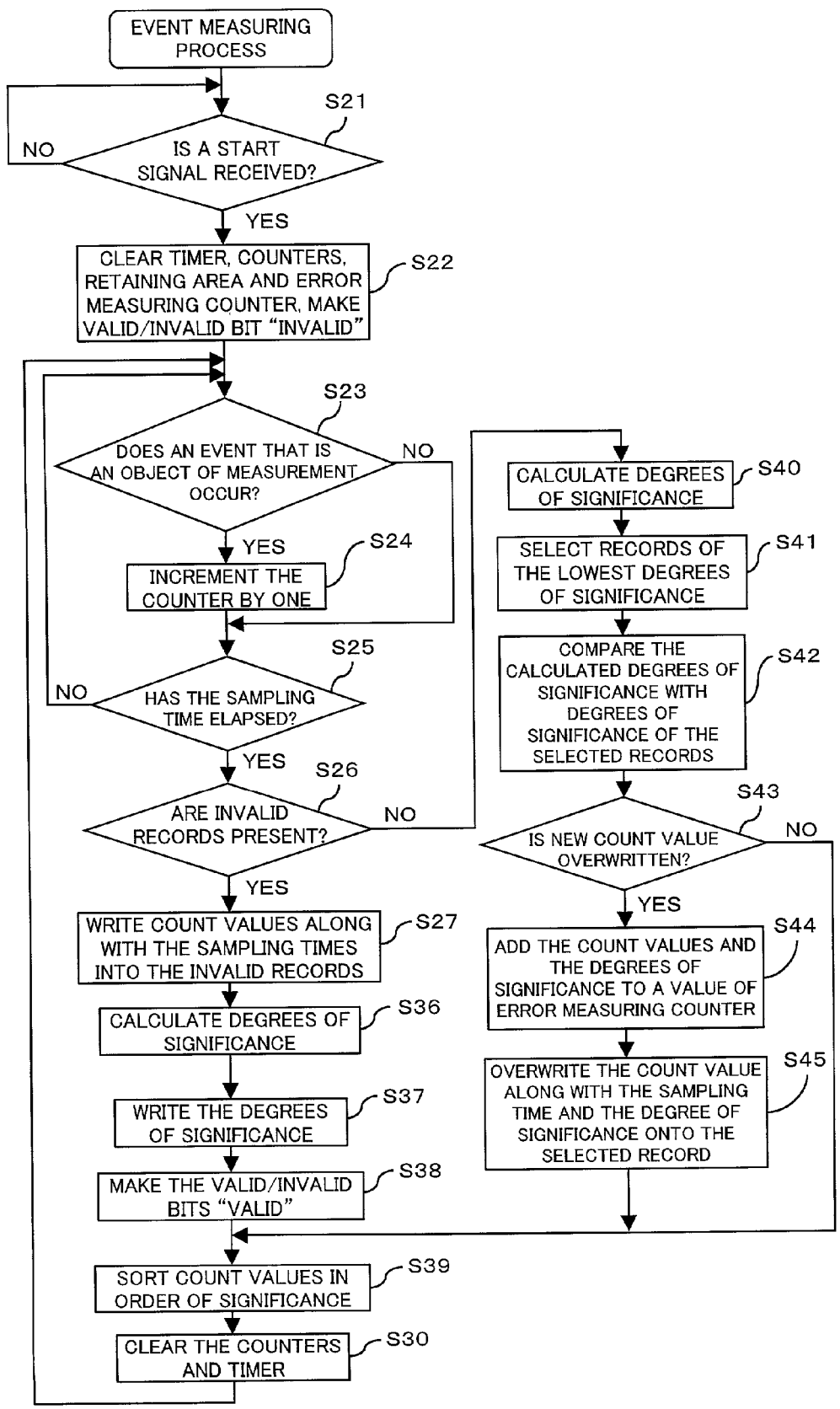
FIG. 7 is a flowchart for illustrating a procedure of measuring events according to the second embodiment.

Next, an operation of the performance measuring counter 30A in the above structure according to the second embodiment will be described with reference to FIG. 7. A procedure of collecting information on performance of the processor 20 is basically similar to that shown in FIG. 3, description of which is thus omitted. A procedure of measuring events (the event measuring process at step S14 in FIG. 3) according to the second embodiment will be now described with reference to a flowchart (steps S21 to S27, S30, and S36 to S45) shown in FIG. 7. At steps denoted by the same step numbers as the step numbers in FIG. 4, similar processes to those described above with reference to FIG. 4 are performed.

When the performance measuring counter 30A receives a start signal (YES route at step S21), the timer in the counter controller 32A is cleared to "0". The counter controller 32A sets "0" to all values in the counters 331 and 332, the count value retaining area 341A, and the error measuring counter 342A, and sets "invalid" to the valid/invalid bit V in each record in the count value retaining area 341A (step S22).

With reception of the start signal, the event selector 31A is brought into a state that the event selector 31A can output a signal for incrementing the counters 331 and 332 one by one to the counter controller 32A. When an event satisfying a predetermined condition (here, either one of conditions) occurs (YES route at step S23), the event selector 31A outputs an increment signal to the counter controller 32A to increment a count value of the counter 331 or 332 corresponding to a kind of the event by one (step S24). When receiving the stop signal at step S16 in FIG. 3, the event selector 31A stops to output the increment signal.

The counter controller 32A measures a predetermined sampling time irrespective of presence of occurrence of an event to always determine whether the sampling time has elapsed or not (steps S24 and S25, or NO route at step S23 to step S25). Until the sampling time has elapsed, the process at steps S23 to S25 is repetitively carried out.

When the sampling time has elapsed (YES route at step S25), the counter controller 32A determines whether any vacant record (that is, an invalid record whose valid/invalid bit V is in the invalid state) is present in the count value retaining area 341A (step S26).

When there are at least two invalid records (YES route at step S26), count values (sampled values) and their sampling times at that time of the counters 331 and 332 are written in the different two invalid records (step S27). At this time, a degree of significance of each of the count values is calculated using a predetermined function (step S36), and the degree of significance is also written in the record (step S37). After the valid/invalid bits V are changed from the invalid state to the valid state (step S38), the records are sorted in order of descending degrees of significance (step S39). The timers of the counters 331 and 332 are again set to "0" (step S30), then the procedure returns to step S23.

When all the records in the count value retaining areas 341 are in the valid state, and no invalid record is present (NO route at step S26), degrees of significance of the count values are calculated using the respective predetermined functions (step S40). After that, two records of the lowest degree of significance (at the bottom) are selected among all the records in the count value retaining area 341A (step S41). The degrees of significance of the two count values sampled this time (new count values) are compared with the degrees of significance of the two records (hereinafter referred as selected records) selected at step S41 (step S42).

Two sampled values of higher degrees of significance among the four degrees of significance compared as above are left in the count value retaining area 341A or overwritten. When the new count values are overwritten (YES route at step S43), the sampled values and the degrees of significance of the selected records are added to a value of the error measuring counter 342A (step S44), the new count values, their sampling times and the degrees of significance are overwritten in the selected records, and retained (step S45), then the procedure proceeds to step S39. When information in the selected records is left without overwriting the new count values thereon (NO route at step S43), the procedures proceeds to step S39 without performing the processes at step S44 and S45.

When the determination at step S26 results in that there is only one invalid record, the processes at the above steps S27, and S36 to S38 are performed on one of the two sampled values, while the above processes at steps S40 to S45 are performed on the other sampled value.

In the second embodiment, a counting step of counting the number of events having occurred in the processor 20 (or the computer system 10A) in each sampling cycle is realized at the above steps S23 to S25. A writing step of writing new sampled values obtained at the above counting step into the count value retaining area 341A while leaving sampled values of high degrees of significance in the count value retaining area 341A is realized at the above steps S26, S27, S30 and S36 to S45.

According to the second embodiment of this invention, it is possible to provide functions and effects similar to those provided in the first embodiment. It is also possible to measure peak values of the number of two kinds of events having occurred and times at which the peaks occurred by one value retaining unit 34A.

As a degree of significance, a value calculated by substituting a count value (a sampled value) for a predetermined function is used. It is thereby possible to compare plural kinds (two kinds in the second embodiment) of count values measured on different bases on a common basis. Even if plural kinds of count values measured on different bases mix in one value retaining unit 34A, it is possible to leave count values of higher degrees of significance irrespective of their kinds.

In the second embodiment, the number of two kinds of events having occurred are measured by the respective counters 331 and 332. This invention is not limited to this example. Not less than three counters may be provided to count the number of not less than three kinds of events having occurred. Even in such case, it is possible to provide similar functions and effects to those provided in the above second embodiment, as a matter of course.

[3] Description of Third Embodiment

Figure 8:
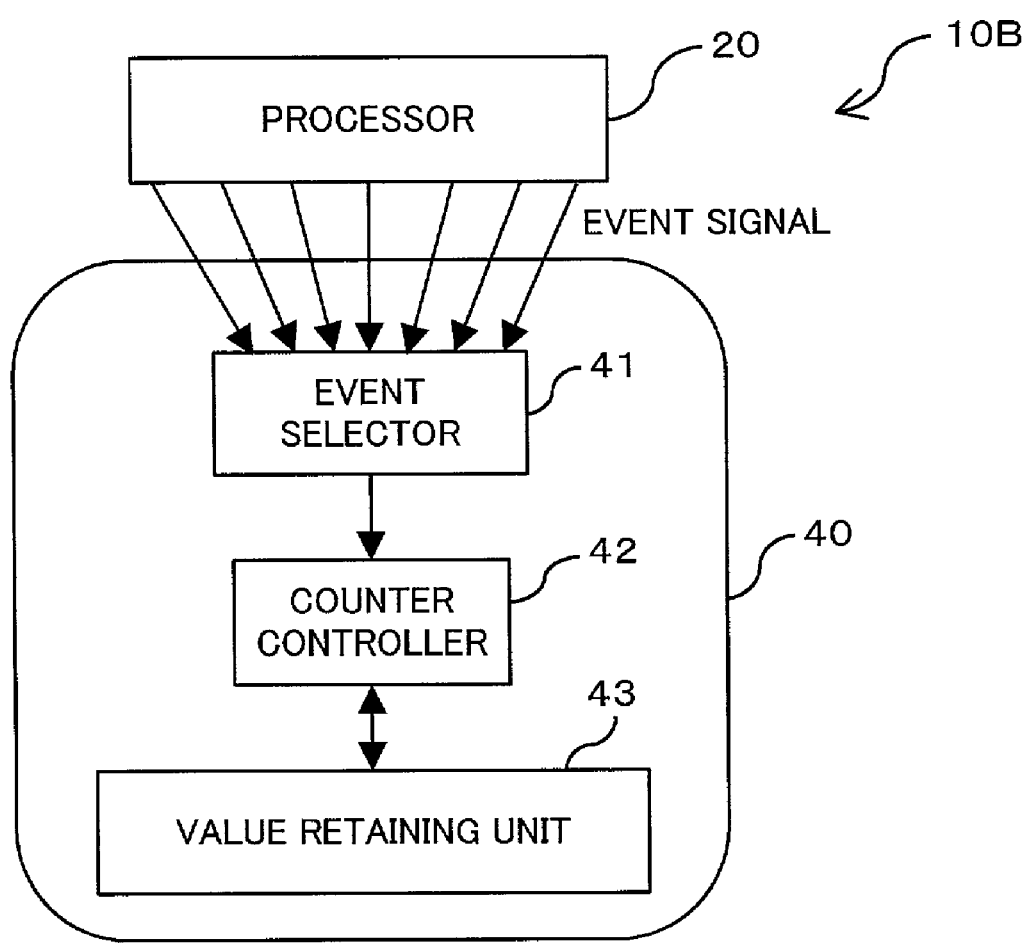
FIG. 8 is a block diagram showing structures of an event measuring apparatus (a performance measuring counter) and a computer system according to a third embodiment of this invention.
Figure 9:
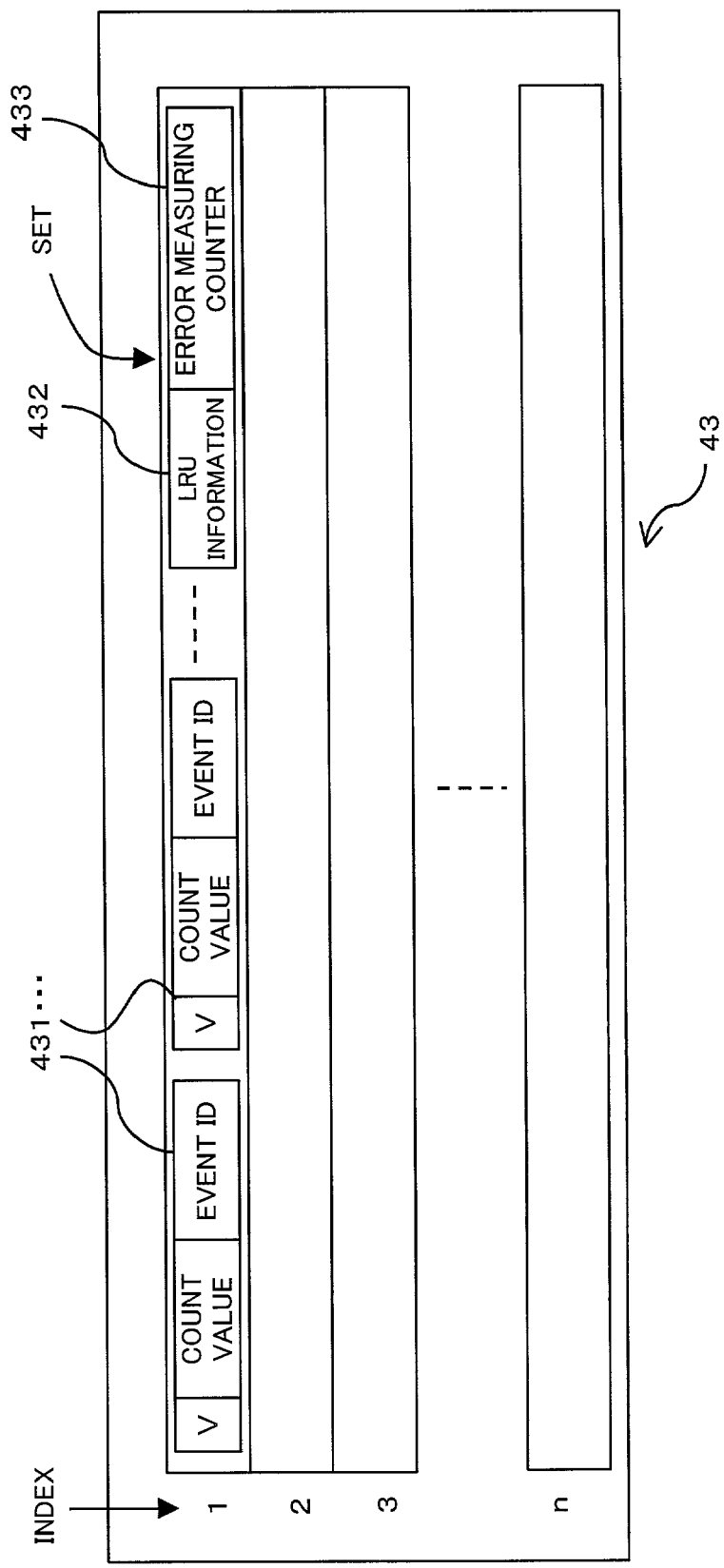
FIG. 9 is a diagram showing a structure of a value retaining unit according to the third embodiment.

FIG. 8 is a block diagram showing structures of an event measuring apparatus (a performance measuring counter) and a computer system according to a third embodiment of this invention. FIG. 9 is a diagram showing a structure of a value retaining unit according to the third embodiment.

As shown in FIG. 8, a computer system 10B according to the third embodiment comprises a processor 20, a performance measuring counter 40 and various components (not shown).

Like the processor 20 according to the first embodiment, the processor 20 performs information processing, which is an object of performance measurement (an object of measurement of the number of events having occurred).

The performance measuring counter (an event measuring apparatus) 40 is integrated in the computer system 10B to measure the number of events having occurred, which are an object of measurement, in the processor 20 (or the computer system 10B). The performance measuring counter 40 according to the third embodiment comprises an event selector 41, a counter controller 42 and a value retaining unit 43 to collect mainly information on memory accesses. Particularly in the third embodiment, the entire memory space in the processor 20 (or the computer system 10B) is divided into a plurality of blocks, and the event selector 41 and the counter controller 42 count the number of accesses to each block as the number of events having occurred while recognizing an address of each block as a kind of events.

The event selector 41 receives an event signal and an event ID (a memory address at the time of occurrence of the event) from each part of the processor 20, and functions as follows: Each event signal is send each time a specific event occurs. An event according to the third embodiment represents, for example, reading/writing of a memory. An event ID represents a memory address at that time. Like the event selector 41 according to the first embodiment, various event conditions can be set from the outside to the event selector 41. When the event condition is satisfied, the event selector 41 sends a signal representing that an event occurs and an event ID to the counter controller 42 to instruct the counter controller 42 to increment a corresponding record (a counter) by one in the value retaining unit 43 (a count value retaining area 431) on the basis of the event ID.

The counter controller 42 controls a count value in a corresponding record (a counter) in the value retaining unit 43 (a count value retaining area 431). Namely, the counter controller 42 fulfils a function as a control unit for controlling writing of a count value into each record in the value retaining unit 43.

More concretely, the counter controller 42 counts each kind of events while updating a count value in each record in the value retaining unit 43 (for each event ID in this embodiment). Namely, when receiving the above signal and an event ID from the event selector 41, the counter controller 42 retrieves a record corresponding to the event ID in the value retaining unit 43. When the corresponding record exists, the counter controller increments a count value in the record by one.

When the corresponding record does not exist, that is, when counting of the number of events of a new kind (a new event ID) not retained in the value retaining unit 43 is started, a record (a retaining area) in which a count value of the number of the events are to be retained is secured on the value retaining area 43, and a new count value and an event ID are written into the record. At this time, the counter controller 42 performs such a writing control as to leave a count value of a high degree of significance in the value retaining area 43, as will be described later.

Like the above counter controller 32, the counter controller 42 can clear a count value in each record of the value retaining unit 43 to "0", or set an arbitrary value thereto according to an instruction from the outside. The counter controller 42 also has a function of generating interruption to the processor 20 according to a count value in each record (for example, when the count value overflows, etc.).

A function as a counting unit for counting the number of events having occurred in the processor 20 (or the computer system 10B) is realized by the above event selector 41, the counter controller 42 and each record in the value retaining unit 43.

The value retaining unit (a retaining unit) 43 retains a count value obtained by the above function of the counting unit. In the value retaining unit 43, as shown in FIG. 9, the entire area in which count values are held is divided into a plurality of sets (n sets in the drawings) using a hash table, where a set associative system is employed to overwrite a new count value on the basis of an updating time of the count value in each set. The whole value retaining unit 43 is presented as an arrangement of the above sets.

Each set has a count value retaining area 431, an LRU information retaining area 432 and an error measuring counter 433.

The count value retaining area (a retaining area) 431 has a predetermined number of records being able to hold count values therein. Each record holds a set of an event ID, and the number of events having occurred (a count value) corresponding to the event ID, along with a valid/invalid bit (mentioned as V in the drawing) representing whether the record is valid or invalid.

The LRU (Least Recently Used) information retaining area 432 holds update information on each record in the set. According to the third embodiment, LRU information, that is, information about the order in which count values were accessed (the order in which the count values were updated)

in the records is recorded in the LRU information retaining area 432, in order to perform a process to expel a count value using an updating time of the count value as a degree of significance.

The error measuring counter (an error measuring unit) 433 records a total value of count values expelled from the records in the set. Namely, the error measuring counter 433 measures a total value of count values discarded by overwriting new count values thereon in the records in the set as an error, and retains it. According to this embodiment, the error measuring counter 433 is provided in each set. However, one similar error counter may be provided to the value retaining unit 43 (the entire total value retaining area 431).

In the above value retaining unit 43, each record (counter) is located according to an index, using a hash function to transform the event ID as a key. The hash function used here is a function for taking out lower bits of an event ID (a memory address) as an index. According to the index, one set is selected. Each event ID in the set is compared with an event ID send from the counter controller 42, whereby a record having the same event ID (a corresponding record) is retrieved.

When the corresponding record is found, a count value in the corresponding record is incremented by one, and LRU information in the LRU information retaining area 432 is rewritten. When the corresponding record is not found, a record retaining a count value to be expelled is determined according to the LRU information, the count value is added in the error measuring counter 433, after that, the new event ID and the new count value are overwritten in the record. At this time, the new count value becomes "1", as a matter of course.

The event selector 41 and the counter controller 42 (the counting unit and the control unit) mentioned above are realized by exclusive software (an event measuring program) as well as the first and second embodiments.

Figure 10:
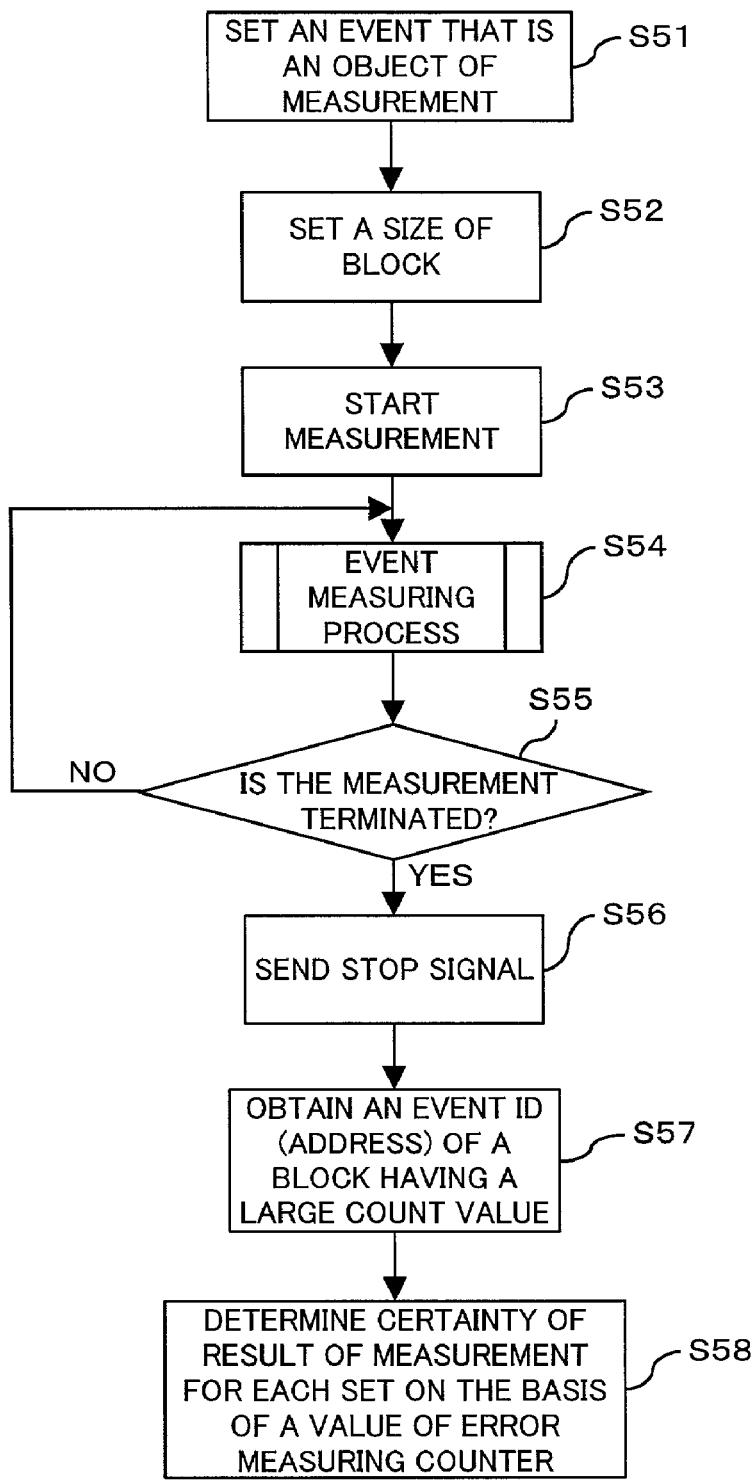
FIG. 10 is a flowchart for illustrating a procedure of collecting information on performance of the processor (or the computer system) according to the third embodiment.
Figure 11:
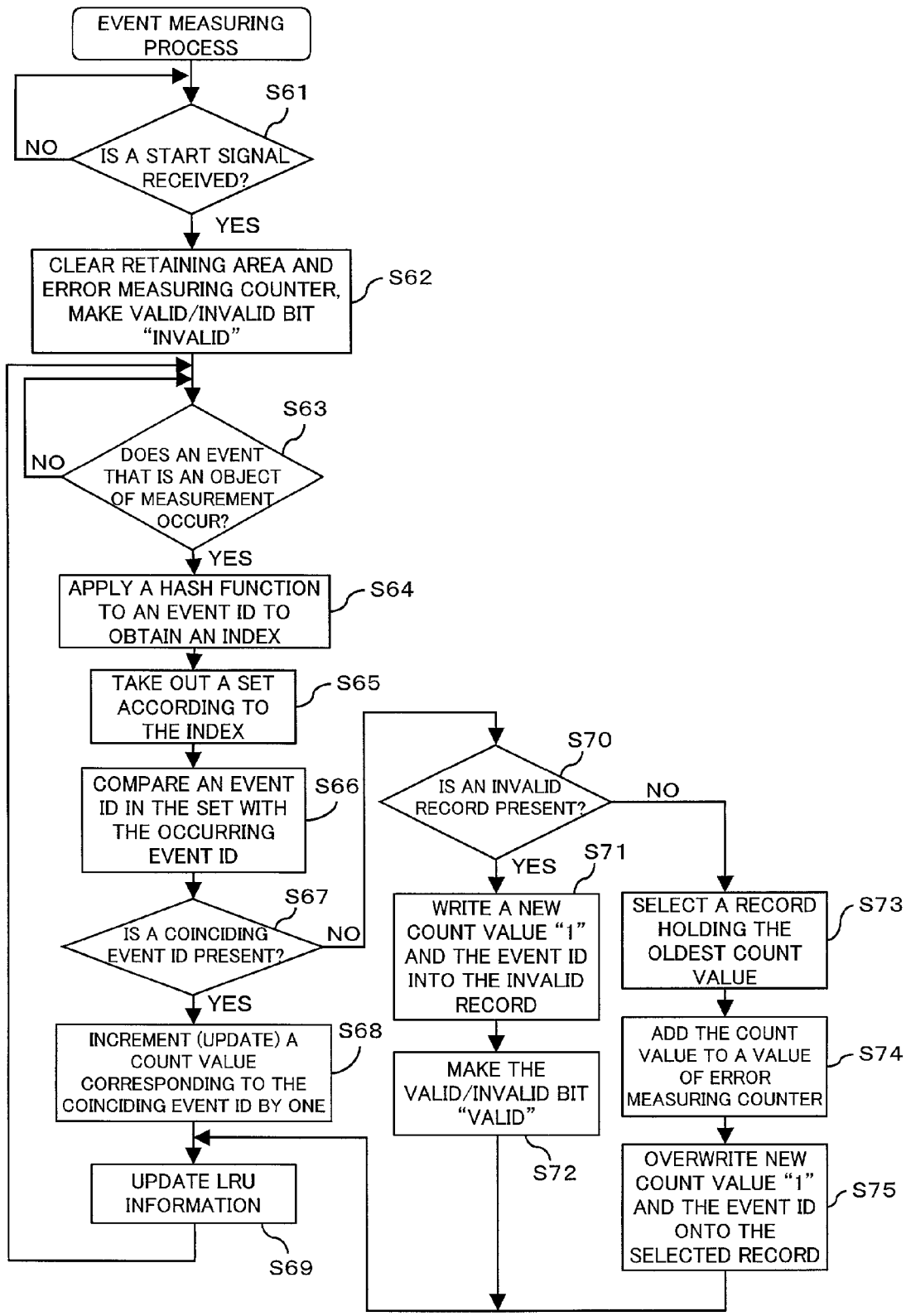
FIG. 11 is a flowchart for illustrating a procedure of measuring events according to the third embodiment.

Next, an operation of the performance measuring counter 30B in the above structure according to the third embodiment will be described with reference to FIGS. 10 and 11.

First, a procedure of collecting information on performance of the processor 20 according to the third embodiment will be described with reference to a flowchart (steps S51 to S58) shown in FIG. 10. The user selects an event that the user desires to collect information thereon (for example, the number of accesses to a remote node), and sets it as an event that is an object of measurement in the event selector 41 (step S51). The user also designates a size of a block (for example, units of page, units of cache block, or the like) that is a divided unit of the entire memory space in the processor 20 (step S52).

After that, the user sends a start signal to the performance measuring counter 30B (the event selector 41 and the counter controller 42) to initiate event measurement (step S53). Whereby, an event measuring process to be described later with reference to FIG. 11 is executed (step S54). When the event measuring process is terminated (YES route at step S55), the user sends a stop signal to the performance measuring counter 30B to terminate the measuring operation by the performance measuring counter 30B (step S56).

The user takes out collected data from the value retaining unit 43, and obtains an event ID (a memory address) of a block whose count value is large (step S57). The user compares a total value of count values retained in the records with a value of the error measuring counter 433, thereby recognizing what rate to the whole total value count values have been discarded is. The user thereby judges certainty of the finally obtained count value (a value in each record) (step S58).

Secondary, a procedure of measuring events (the event measuring process at step S54 in FIG. 10) according to the third embodiment will be described with reference to a flowchart (steps S61 to S75) shown in FIG. 11.

When the performance measuring counter 30B receives a start signal (YES route at step S61), the counter controller 42 sets "0" to all values in the count value retaining area 431 (records) and the error measuring counter 433, and sets "invalid" to the valid/invalid bit V in each of the records (step S62).

With reception of the start signal, the event selector 41 is brought into a state that the event controller 41 can output a signal for incrementing a count value one by one and an event ID to the counter controller 42. When an event satisfying a predetermined condition (an event that is an object of measurement) occurs, an increment signal and an event ID are outputted to the counter controller 42 (YES route at step S63). When receiving a stop signal at step S56 in FIG. 10, the event selector 41 terminates to output the increment signal and the event ID.

The counter controller 42 applies a hash function to the received event ID to obtain an index (step S64), and takes out a set according to the index from the value retaining unit 43 (step S65). The counter controller 42 compares the event ID in the set with the event ID (an ID of the event occurring this time) from the event selector 41 (step S66) to determine whether a coinciding event ID exists or not (step S67).

When the coinciding event ID exists (YES route at step S67), the counter controller 42 increments a count value in a record holding the event ID by one to update the count value (step S68). The counter controller 42 such updates LRU information that the record updated this time becomes the latest in the LRU information retaining area 433 (step S69), after that, the procedure returns to step S63.

When the coinciding event ID does not exist (NO route at step S67), the counter controller 42 determines whether there is a vacant record (that is, an invalid record whose valid/invalid bit V is in the invalid state) in the set (step S70).

When an invalid record is present (YES route at step S70), a new count value "1" and the event ID are written in the invalid record (step S71). The valid/invalid bit V in the invalid record is changed from the invalid state to the valid state (step S72). The LRU information is such updated that the record updated this time becomes the latest (step S69), and the procedure returns to step S63.

When all records in the set are in the valid state and no invalid record exists (NO route at step S70), the counter controller 42 refers the LRU information retaining area 433, selects a record holding the oldest count value (that is, a record that has not been accessed and updated for the longest time) among all the records in the set (step S73), adds a count value of the selected record (hereinafter referred as a selected record) to a value of the error measuring counter 433 (step S74), then overwrites the new count value "1" and the event ID thereon in the selected record to retain them (step S75). The counter controller 42 such updates the LRU information that the record updated this time becomes the latest (step S69), and the procedure returns to step S63.

According to the third embodiment of this invention, an attribute of "degree of significance" (LRU information, that is, an updating time in this embodiment) is given to each count value retained in the count value retaining area 431 in the value retaining unit 43. When a count value to be written occurs in excess of a capacity of the count value retaining area 431 of the value retaining unit 42, a new count value is overwritten in a record of a low degree of significance. Whereby, a count value in relation with a value of a large degree of significance is always left in the value retaining unit 43.

Here, consideration is made of practical events to be recorded in the performance measuring counter 30B according to the third embodiment. The first and second embodiments comply with a case where a region of objects to be measured is vast in time. The third embodiment complies with a case where a region of objects to be measured is vast in space. For example, in order to collect data with respect to the entire address space, the known method needs a memory in the same level as the whole memory for retaining count values. The performance measuring counter 30B according to the third embodiment 30B uses the value retaining unit 43 of a small capacity to collect data from which a situation of the whole memory space can be efficiently grasped.

Even if a capacity of the value retaining unit 43 is small, it is possible to certainly and efficiently collect highly necessary count values. Even when event information on a vast space such as an entire memory space is collect, only data necessary to obtain statistical information is left in the value retaining unit 43, so that data useful to finally determine the total performance of the processor 20 (or the computer system 10B) is obtained.

Accordingly, it becomes possible to collect information on the entire memory space while avoiding unnecessary overhead, and with a small hardware physical quantity (for example, a memory capacity in a degree that it can be contained in LSI), and to certainly measure or tune the performance of even a relatively small-sized processor. In other words, only significant information is retained in the value retaining unit 43, whereas information of a low degree of significance is expelled, so that data in a wide range can be efficiently collected with the value retaining unit 43 of a small capacity, without saving count values onto the memory or starting special software.

According to the third embodiment, the entire memory space in the processor 20 (or the computer system 10B) is divided into a plurality of blocks, and the number of accesses to each block is counted as the number of events having occurred, with an address of each block being recognized as a kind of events (an event ID). It is thereby possible to efficiently collect information on a block in which the number of events having occurred in the entire vast memory space, and the number of the events having occurred, using the value retaining unit 43 of a small capacity.

According to the first and second embodiments, records are sorted in order of descending count values or degrees of significance to find the smallest count value or the lowest degree of significance. In such manner, overhead inevitably generates because of the sorting process executed each time the count value is updated.

For this, a different reference is employed as a degree of significance in the third embodiment. In a cache memory, there is often used the LRU system to determine to expel a cache block. This is a system in which the highest priority is given to a block accessed latest, whereas a low priority is given to a block not accessed for a long time. A reference of priority used in the cache memory is employed as a reference to determine a degree of significance in the third embodiment. Namely, a count value in a record updated latest has the highest degree of significance, and a count value in a record whose updating time is the oldest is first discarded.

According to the third embodiment, the employment of the LRU system allows omission of the sorting process only by setting the highest degree of significance to a record when a count value of the record is updated. As compared with the first and second embodiments, the third embodiment can decrease the overhead.

The entire area holding count values is divided into a plurality of sets using a hash table in the value retaining unit 43, and a set associative system is employed to overwrite a new count value on the basis of an updating time of the count value in each set, so that plural kinds of count values can be managed readily and certainly according to the updating time.

According to the third embodiment, the error measuring counter 433 similar to the error measuring counter 342 according to the first embodiment is used to measure and retain a total value of discarded count values in each set, so that the magnitude (a total value) of all count values discarded by overwriting from the value retaining unit 43 can be compared with a total value finally left in the value retaining unit 43.

Although the magnitude of each discarded count value is unknown, it is possible to recognize what rate to the whole total value count values have been discarded in the set. Namely, it is possible to recognize how much values finally left in the value retaining unit 43 reflect the whole count values, thereby to determine certainty of count values left in the value retaining unit 43.

[3-1] Description of First Modification of Third Embodiment

The performance measuring counter 40 described above with reference to FIGS. 8 and 9 is used in a first modification of the third embodiment.

The above performance measuring counter 40 according to the third embodiment counts the number of accesses to each block while recognizing a memory address of each block configuring the memory space in the processor 20 (or the computer system 10B) as an event ID.

According to the first modification of the third embodiment, the same performance measuring counter 40 is used to collect mainly information about execution of instructions. More concretely, the number of events having occurred is counted while an address of an instruction that is a factor of occurrence of the event is recognized as an event ID (a kind of events). Namely, an address of an instruction is used as an event ID instead of a memory address, the number of the events having occurred is recorded along with an address of the instruction, which is a factor of occurrence of the event, in the value retaining unit 43, whereby an address of the instruction that has caused frequent occurrence of the events and the number of time of the occurrence among all execution instructions can be recorded.

According to this modification, the manner of obtaining an event ID by the event selector 41 is different from the above third embodiment. According to this modification, the event selector 41 receives an event signal and an event ID (an instruction address of a source of the event occurrence) from each part of the processor 20. Each event signal is sent whenever a specific event occurs. An event in this embodiment signifies, for example, execution of a jump instruction. An event ID signifies an instruction address at that time. Various event conditions can be set to the event selector 41 from the outside, as well as the event selector 41 according to the third embodiment. When the event condition is satisfied, the event selector 41 sends a signal representing that the event occurs and an event ID to the counter controller 42 to instruct the counter controller 42 to increment a corresponding record (a counter) in the value retaining unit 43 (a count value retaining area 431) by one on the basis of the event ID.

Figure 12:
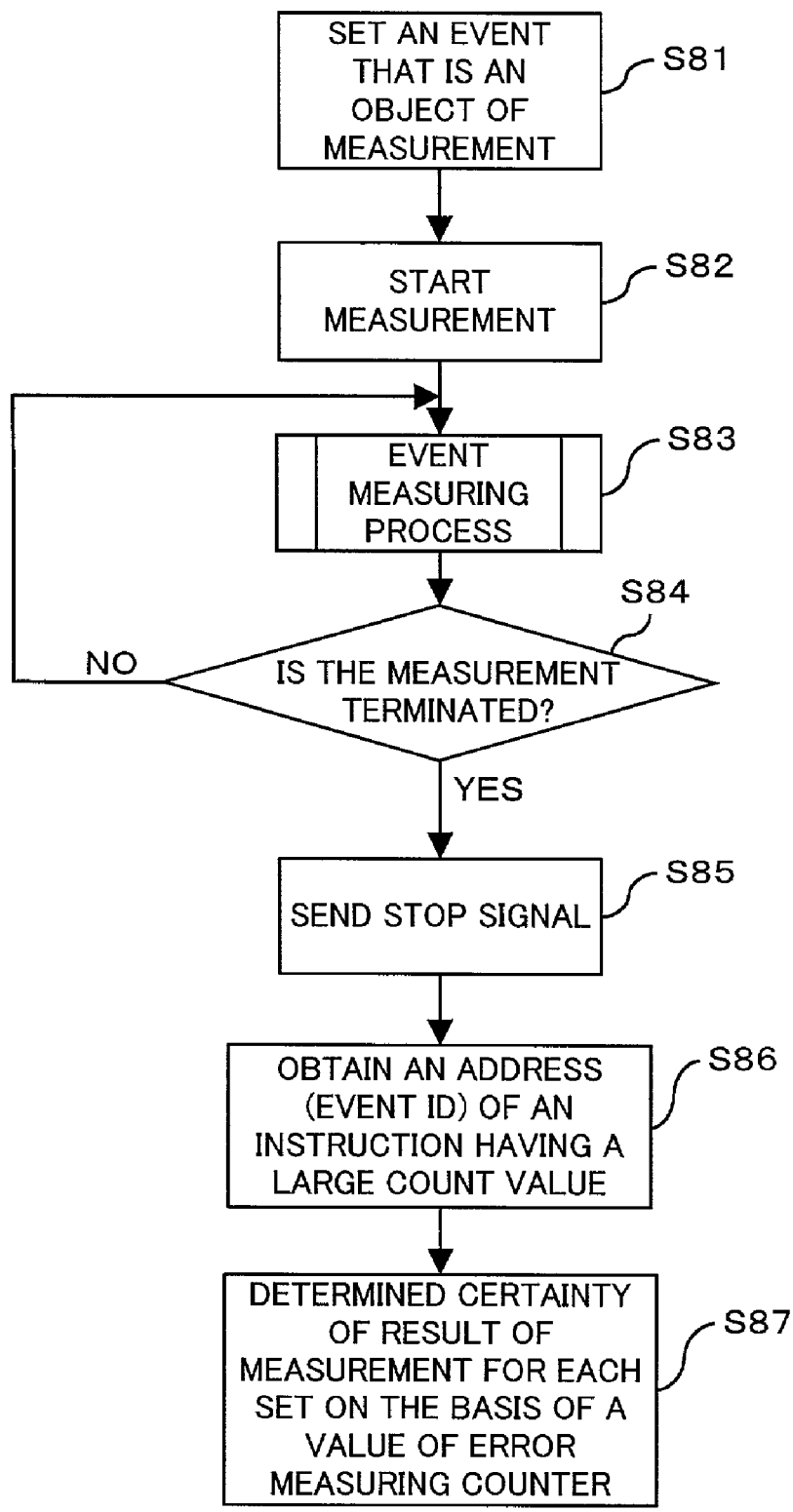
FIG. 12 is a flowchart for illustrating a procedure of collecting information on performance of the processor (or the computer system) according to a first modification of the third embodiment.

Next, description will be made of a procedure of collecting information on performance of the processor 20 according to the first modification of the third embodiment with reference to a flowchart (steps S81 to S87) shown in FIG. 12. The user selects an event (for example, occurrence of branch prediction miss) that the user desires to collect information thereon, and sets it as an event that is an object of measurement in the event selector 41 (step S81).

After that, the user sends a start signal to the performance measuring counter 30B (the event selector 41 and the counter controller 42) to initiate measurement of the event (step S82), whereby the event measuring process described above with reference to FIG. 11 is executed (step S83). At step S83, the event measuring process is executed in the similar procedure shown in FIG. 11 except that the event ID is changed from a memory address to an address of the instruction. When the event measuring process is terminated (YES route at step S84), the user sends a stop signal to the performance measuring counter 30B to terminate the measuring operation by the performance measuring counter 30B (step S85).

The user takes out collected data from the value retaining unit 43. The user thereby obtains an event ID of an event whose count value is large, that is, an address of the instruction that is a factor of occurrence of the event (step S86). The user compares a total value of count values retained in the records with a value of the error measuring counter 433 for each set, recognizes what rate to the whole count values count values have been discarded is, and determines certainty of finally obtained count values (values left in the records) (step S87).

According to the first modification of the third embodiment, the memory is not divided as done in the above third embodiment, but a record (a counter) is prepared for each address of instruction in the value retaining unit 43. Whereby, it is possible to collect information about which instruction tends to cause a cache miss, or which command tends to cause a branch prediction miss, for example.

At that time, the number of events having occurred is counted while an address of an instruction that is a factor to cause the event is recognized as an event ID, it is possible to efficiently collect an instruction that has caused frequent occurrence of the events among all execution instructions and the number of the events having occurred using the value retaining unit 43 of a small capacity without saving count values onto the memory or starting special software. Namely, it is possible to efficiently collect event information about a vast space, which is the entire program, by preparing a small area.

[3-2] Description of Second Modification of Third Embodiment

The performance measuring counter 40 described above with reference to FIGS. 8 and 9 is also used in a second modification of the third embodiment. According to the second modification, information to be collected by the performance measuring counter 40 is not limited to a set of blocks in which the number of events having occurred is large and the number of the events, or a set of an address of an instruction having caused frequent occurrence of events and the number of the events, but the performance measuring counter 40 collects the number of various events having occurred, event IDs each of which can specify a kind of the events, and a degree of significance of the event.

Figure 13:
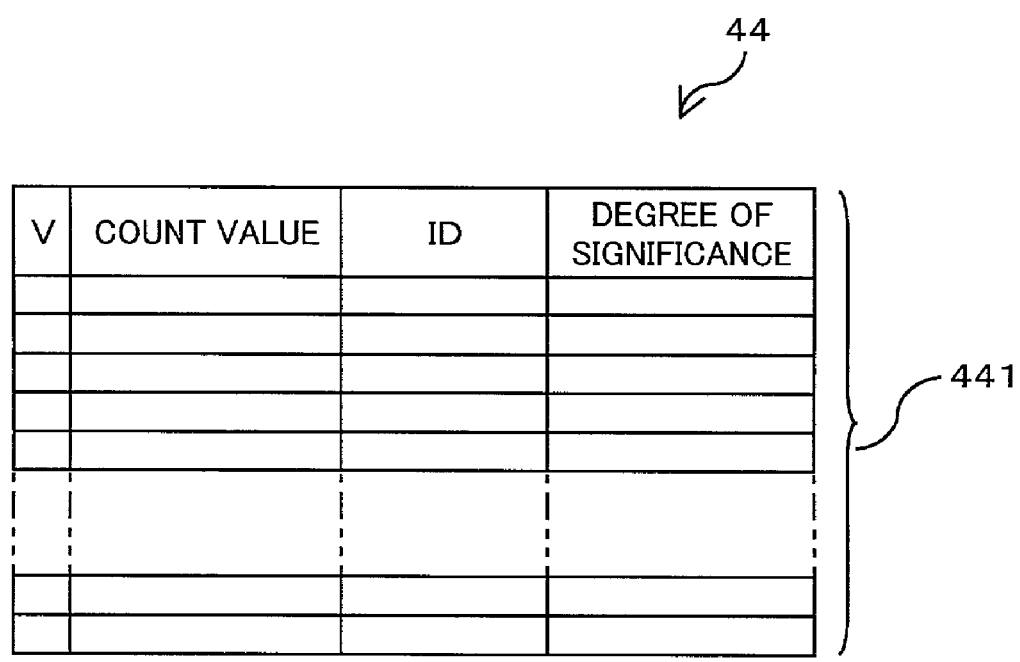
FIG. 13 is a diagram showing a structure of a value retaining unit according to a second modification of the third embodiment.
Figure 14:
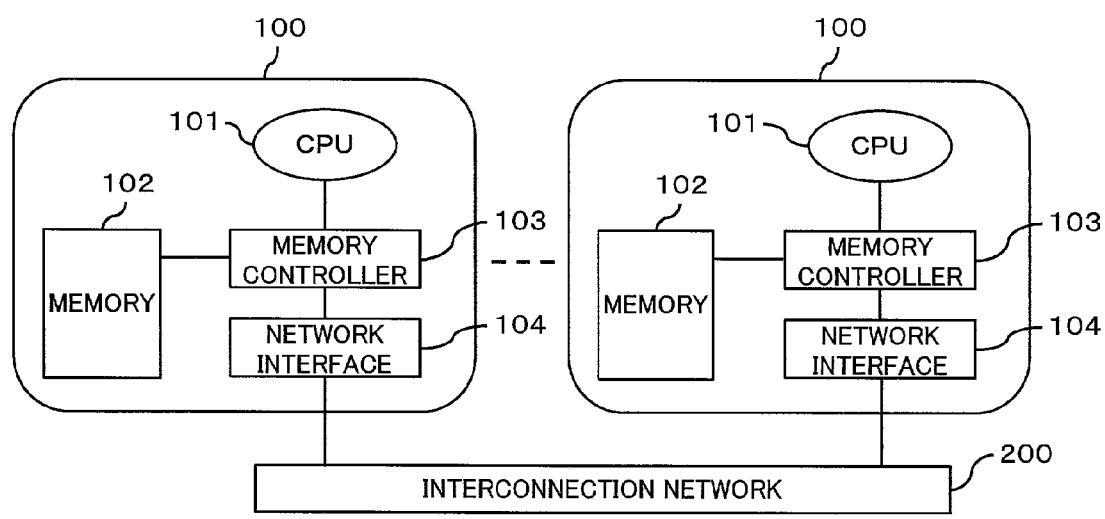
FIG. 14 is a block diagram showing a structure of a known parallel computer of a distributed shared storage type.

According to the second modification, a value retaining unit (a retaining unit) 44 as shown in FIG. 13 is provided instead of the above value retaining unit 43. FIG. 13 is a diagram showing a structure of the value retaining unit 44 according to the second modification of the third embodiment.

As shown in FIG. 13, the value retaining unit (a retaining unit) 44 comprises a count value retaining area 441. The value retaining unit 44 may also comprise an error measuring counter (an error measuring unit; not shown) similar to that according to the first to third embodiments.

The count value retaining area (a retaining area) 441 in the value retaining unit 44 has a predetermined number of records, as well. Each record includes an area holding a count value to be updated by the above event selector 41 and counter controller 42, an area holding an event ID (a kind of events) corresponding to the count value, an area holding a valid/invalid bit V, and an area holding a degree of significance calculated in the similar manner to the second embodiment, for example.

The performance measuring counter 40 including the above value retaining unit 44 is used, instead of the value retaining unit 43. If there is not a vacant record in the value retaining unit 44 into which a count value is to be written when measurement of the number of a new kind of events is started, a count value of a low degree of significance is expelled from the value retaining unit 44, and a new count value is written therein. Whereby, only information of significant kinds is left in the value retaining unit 44, whereas information of a low degree of significance is expelled, so that various kinds of data necessary to measure or tune the performance of the processor 20 (or the computer system 10B) can be efficiently collected using the value retaining unit 44 of a small capacity without saving count values onto the memory or starting specific software.

[4] Others

The present invention is not limited to the above examples, but may be modified in various ways without departing from the scope of the invention.

What is claimed is:

1. An event measuring apparatus comprising:
    a counting unit counting a number of events having occurred in a processor or a component comprising a computer system;
    a retaining unit retaining a count value obtained by said counting unit; and
    a control unit controlling writing of said count value into said retaining unit;
    said control unit controlling said writing to write a new count value obtained by said counting unit into said retaining unit while retaining a previous count value if said count value is determined to have a high degree of significance, necessary to obtain statistical information to determine a performance of said processor or said computer system, in said retaining unit.

2. An event measuring apparatus comprising:
    a counting unit counting a number of events having occurred in a processor or a component comprising a computer system;
    a retaining unit retaining a count value obtained by said counting unit; and a control unit controlling writing of said count value into said retaining unit;

said control unit controlling said writing to write a new count value obtained by said counting unit into said retaining unit while leaving a count value of a high degree of significance, necessary to obtain statistical information to determine a performance of said processor or said computer system, in said retaining unit, wherein said counting unit counts the number of said events having occurred within a period of predetermined time at each of said predetermined time, and said control unit writes a count value obtained by said counting unit as said new count value along with a measuring time of said count value into said retaining unit at each of said predetermined time.

3. The event measuring apparatus according to claim 2, wherein said degree of significance is said count value.

4. The event measuring apparatus according to claim 2, wherein said degree of significance is a value calculated by substituting said count value for a predetermined function.

5. The event measuring apparatus according to claim 2, further comprising an error measuring unit for measuring a total value of count values, discarded by overwriting said new count values thereon in said retaining unit, as an error and retaining the same.

6. An event measuring apparatus comprising:

a counting unit counting a number of events having occurred in a processor or a component comprising a computer system;

a retaining unit retaining a count value obtained by said counting unit; and a control unit controlling writing of said count value into said retaining unit;

said control unit controlling said writing to write a new count value obtained by said counting unit into said retaining unit while leaving a count value of a high degree of significance, necessary to obtain statistical information to determine a performance of said processor or said computer system, in said retaining unit, wherein said counting unit counts the number of each kind of events by updating a count value in said retaining unit, and when said counting unit starts to count the number of events of a new kind not retained in said retaining unit, said control unit secures a retaining area to retain therein a count value of said events of a new kind on said retaining unit, and writes that count value of said events of a new kind having occurred as said new count value into said retaining area.

7. The event measuring apparatus according to claim 6, wherein said degree of significance is an updating time of said count value by said counting unit.

8. The even measuring apparatus according to claim 7, wherein a set associative system, in which an entire area retaining said count values is divided into a plurality of sets using a hash table and said new count value is overwritten thereon on the basis of an updating time of said count value in each of said sets, is employed in said retaining unit.

9. The event measuring apparatus according to claim 8, wherein an entire memory space in said processor or said computer system is divided into a plurality of blocks, and said counting unit counts the number of said events while recognizing an address of each of said blocks as a kind of said events.

10. The event measuring apparatus according to claim 8, wherein said counting unit counts the number of said events while recognizing an address of an instruction, which is a factor that caused occurrence of said event, as a kind of said events.

11. The event measuring apparatus according to claim 8, further comprising one error measuring unit for said entire area, said error measuring unit for said entire area, said error measuring unit measuring a total value of count values, discarded by overwriting said new count values thereon in said retaining unit, as an error and retaining the same.

12. The even measuring apparatus according to claim 8, further comprising an error measuring unit for each of said sets, said error measuring unit measuring a total value of count values, discarded by overwriting said new count values thereon in said retaining unit, as an error and retaining the same.

13. The event measuring apparatus according to claim 7, wherein said counting unit counts the number of said events while recognizing an address of an instruction, which is a factor that causes occurrence of said event, as a kind of said events.

14. The event measuring apparatus according to claim 6, wherein an entire memory space in said processor or said computer system is divided into a plurality of blocks, and said counting unit counts the number of accesses to each of said blocks as the number of said events while recognizing an address of each of said blocks as a kind of said events.

15. The event measuring apparatus according to claim 7, wherein an entire memory space in said processor or said computer system is divided into a plurality of blocks, and said counting unit counts the number of accesses to each of said blocks as the number of said events while recognizing an address of each of said blocks as a kind of said events.

16. The event measuring apparatus according to claim 6, wherein said counting unit counts the number of said events while recognizing an address of an instruction, which is a factor that caused occurrence of said event, as a kind of said events.

17. An event measuring apparatus comprising:

a counting unit counting a number of events having occurred in a processor or a component comprising a computer system;

a retaining unit retaining a count value obtained by said counting unit; and a control unit controlling writing of said count value into said retaining unit;

said control unit controlling said writing to write a new count value obtained by said counting unit into said retaining unit while leaving a count value of a high degree of significance, necessary to obtain statistical information to determine a performance of said processor or said computer system, in said retaining unit; and an error measuring unit measuring a total value of count values, discarded by overwriting said new count values thereon in said retaining unit, as an error and retaining the same.

18. An event measuring method comprising the steps of:

a counting step of counting a number of events having occurred in a processor or a component comprising a computer system; and a writing step of writing a new count value into a retaining unit while retaining a previous count value if said previous count value is determined to have a high degree of significance, necessary to obtain statistical information to determine a performance of said processor or said computer system, in said retaining unit when said new count value is obtained at said counting step.

19. A computer readable record medium recording thereon an event measuring program which makes a computer function as a counting unit counting a number of events having occurred in a processor or a component comprising a computer system, and a control unit controlling writing of a new count value obtained by said counting unit in a retaining unit to write said count value into said retaining unit while retaining a previous count value if said previous count value is determined to have a high degree of significance, necessary to obtain statistical information to determine a performance of said processor or said computer system, in said retaining unit.

20. A computer system, comprising:
a processor performing information processing;
a counting unit counting a number of events having occurred in said processor;
a retaining unit retaining a count value obtained by said counting unit; and
a control unit controlling writing of said count value into said retaining unit;
said control unit controlling said writing so as to write a new count value obtained by said counting unit into said retaining unit while retaining a previous count value if said previous count value is determined to have a high degree of significance, necessary to obtain statistical information to determine a performance of said computer system, in said retaining unit.

21. A computer system, comprising:
a processor performing information processing;
a counting unit determining a count value as a number of occurrences of a user-selectable type of event that occur in the processor during a predetermined time interval;
a retaining unit; and
a control unit writing a current count value into the retaining unit at an end of each time interval if one of
the retaining unit is not full, or
a degree of significance of the current count value is greater than a degree of significance of an entry in the retaining unit,
wherein the degree of significance of a given count value is one of
the count value itself,
a calculated function employing the count value, or
a measure of how recently a count value of a given type of event has been written in the retaining unit if multiple types of events are counted.

22. A method, comprising:
using a counting unit, determining a count value as a number of occurrences of a user-selectable type of event that occur in a processor during a predetermined time interval; and
using a control unit, writing a current count value into a retaining unit at an end of each time interval if one of
the retaining unit is not full, or
a degree of significance of the current count value is greater than a degree of significance of an entry in the retaining unit,
wherein the degree of significance of a given count value is one of
the count value itself,
a calculated function employing the count value, or
a measure of how recently a count value of a given type of event has been written in the retaining unit if multiple types of events are counted.

* * * * *

UNITED STATES PATENT AND TRADEMARK OFFICE
CERTIFICATE OF CORRECTION

PATENT NO. : 7,020,808 B2
APPLICATION NO. : 10/079546
DATED : March 28, 2006
INVENTOR(S) : Sato et al.

It is certified that error appears in the above-identified patent and that said Letters Patent is hereby corrected as shown below:

On title page item (56), Col. 2,
    U.S. Patent Documents, Line 7
    Delete "Holdsclaw et al." and insert --Hubbard et al.--, therefor.

\*     On title page ITEM (57), Col. 2
    Abstract
    Line 14, after "processor or the" delete "a".

\*     Col. 23, line 53, delete "even" and insert --event--, therefor.

\*     Col. 23, line 62, after "number of" insert --accesses to each of said blocks as the number of--

\*     Col. 24, lines 5-6, after "measuring unit", delete "for said entire area, said error measuring unit".

\*     Col. 24, line 10, delete "even" and insert --event--, therefor.

Signed and Sealed this

Eighth Day of August, 2006

JON W. DUDAS
*Director of the United States Patent and Trademark Office*